(12) United States Patent
Haruta

(10) Patent No.: US 12,293,510 B2
(45) Date of Patent: May 6, 2025

(54) INSPECTION SYSTEM, INSPECTION APPARATUS, METHOD OF CONTROLLING THE SAME, AND STORAGE MEDIUM

(71) Applicant: CANON KABUSHIKI KAISHA, Tokyo (JP)

(72) Inventor: Kenichirou Haruta, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 448 days.

(21) Appl. No.: 17/821,991

(22) Filed: Aug. 24, 2022

(65) Prior Publication Data

US 2023/0066402 A1    Mar. 2, 2023

(30) Foreign Application Priority Data

Aug. 30, 2021  (JP) ................................. 2021-140267

(51) Int. Cl.
*G06T 7/00* (2017.01)
*H04N 1/00* (2006.01)

(52) U.S. Cl.
CPC ......... *G06T 7/001* (2013.01); *H04N 1/00718* (2013.01); *G06T 2207/30144* (2013.01)

(58) Field of Classification Search
CPC .................. H04N 1/00718; G06T 2207/30144
USPC ......................................................... 382/112
See application file for complete search history.

(56) References Cited

U.S. PATENT DOCUMENTS

| 2013/0148987 A1* | 6/2013 | Arakawa | G06T 7/40 399/15 |
| 2015/0078627 A1* | 3/2015 | Fukase | G06T 7/001 382/112 |
| 2021/0073966 A1* | 3/2021 | Teshima | G06T 7/001 |

FOREIGN PATENT DOCUMENTS

JP    2015053561 A    3/2015

* cited by examiner

*Primary Examiner* — Gabriel I Garcia
(74) *Attorney, Agent, or Firm* — Canon U.S.A., Inc. IP Division

(57) ABSTRACT

An inspection apparatus obtains a scanned image by reading a printed product, calculates a weighting factor of a weighting filter based on a difference between a value of a pixel of interest in a reference image used in creation of the printed product and values of peripheral pixels of the pixel of interest, performs filter processing by using the weighting filter having the weighting factors, with respect to a pixel of interest in the scanned image, which corresponds to the pixel of interest in the reference image, thereby shifting the pixel of interest in the scanned image, and create an inspection target image by calculating the weighting factors and performing the filter processing with respect to the shifted pixel of interest, and inspects quality of the printed product by collating the inspection target image with the reference image.

17 Claims, 13 Drawing Sheets

F I G. 1
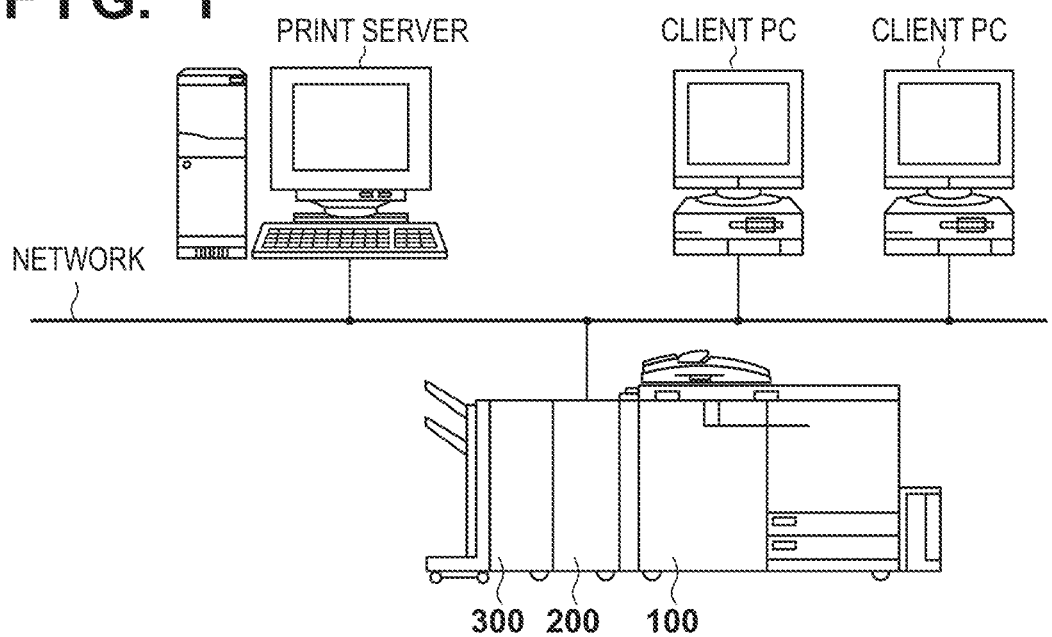
F I G. 2
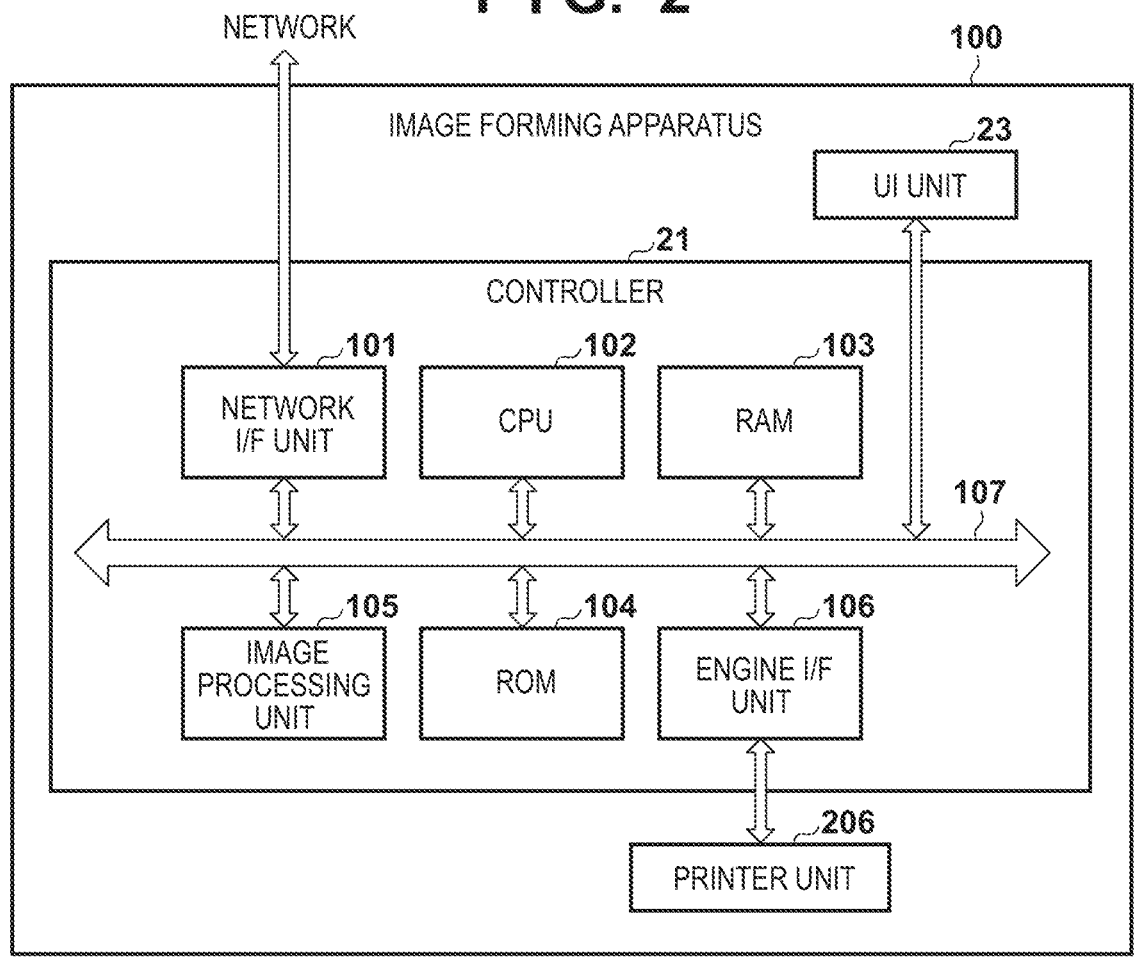

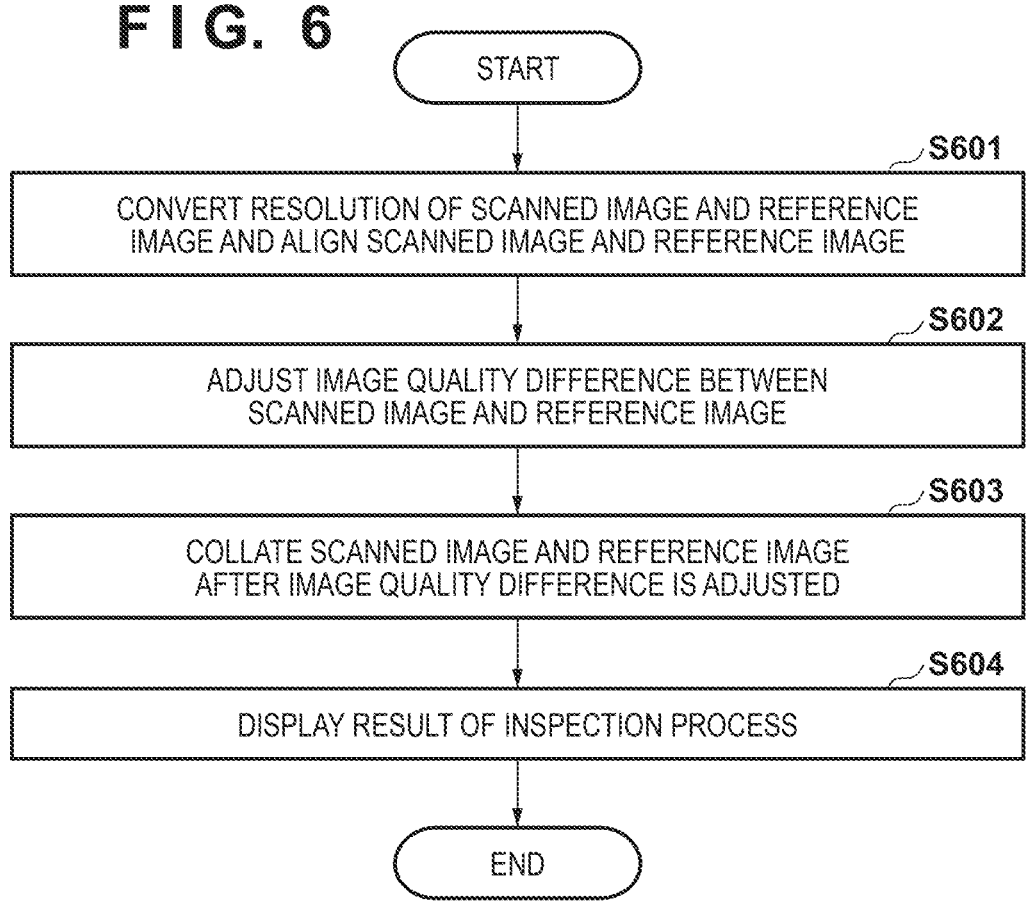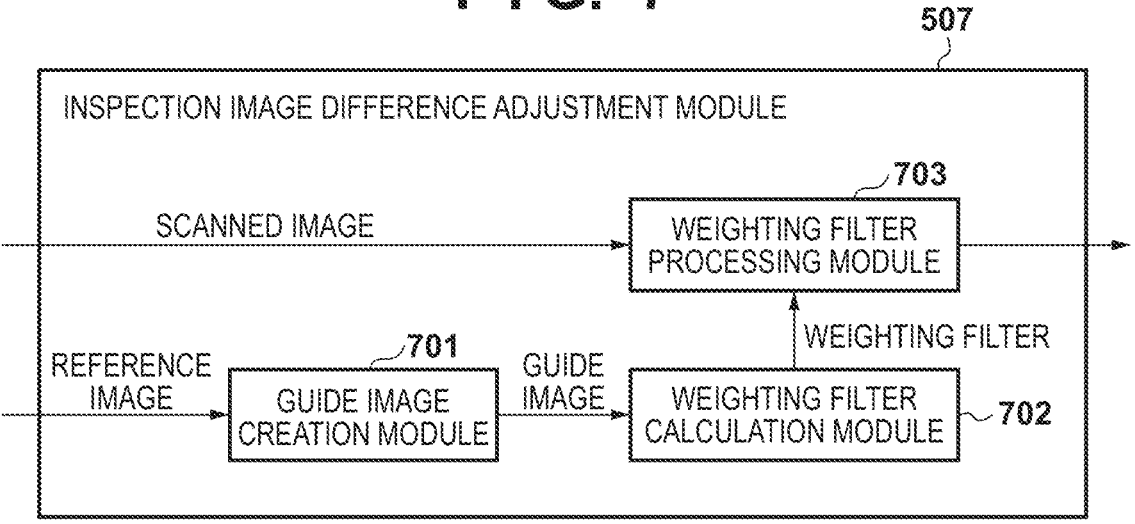

| f(-2,-2) | f(-1,-2) | f(0,-2) | f(1,-2) | f(2,-2) |
| --- | --- | --- | --- | --- |
| f(-2,-1) | f(-1,-1) | f(0,-1) | f(1,-1) | f(2,-1) |
| f(-2,0) | f(-1,0) | f(0,0) | f(1,0) | f(2,0) |
| f(-2,1) | f(-1,1) | f(0,1) | f(1,1) | f(2,1) |
| f(-2,2) | f(-1,2) | f(0,2) | f(1,2) | f(2,2) |

| f(-2,0)=0.2 | f(-1,0)=0.2 | f(0,0)=0.2 | f(1,0)=0.2 | f(2,0)=0.2 |
| --- | --- | --- | --- | --- |

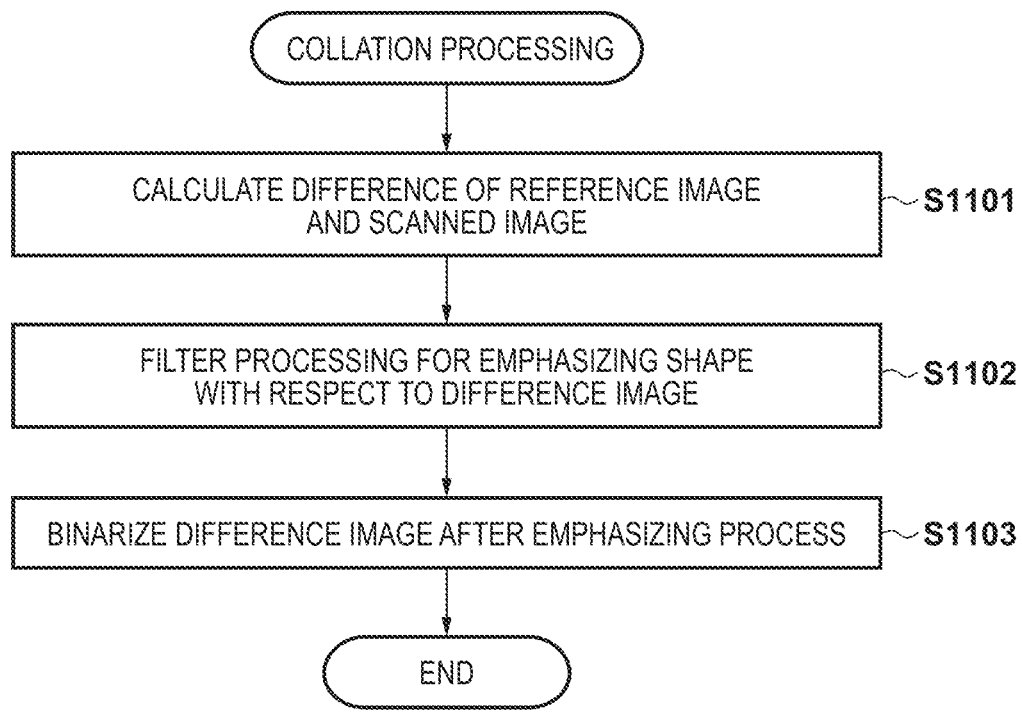

INSPECTION SYSTEM, INSPECTION APPARATUS, METHOD OF CONTROLLING THE SAME, AND STORAGE MEDIUM

BACKGROUND

Field of the Disclosure

The present disclosure relates to an inspection system, an inspection apparatus, a method of controlling the same, and a storage medium.

Description of the Related Art

In a print bookbinding system such as a POD (Print On Demand) machine, there is a printed image inspection system that inspects the quality of an image formed on a printed sheet (printed product), and detects an anomaly of the image of the printed product. In an inspection process of this system, image alignment is performed between digital image data (a reference image (correct image)) used in printing and scanned image data (an inspection target image) obtained by scanning a printed product. After that, an anomaly of the image of the printed product is detected by performing a collating and determination process on the image.

The inspection target image is scanned image data obtained by scanning a printed product on which reference image data is printed. Even when there is no image anomaly, therefore, a difference exists between the reference image and the inspection target image. This difference is produced by, for example, the influence of image processing before printing, the influence of the characteristics of a printing apparatus, and the influence of the characteristics of a scanner that scans a printed product. Examples of the image processing before printing are a color conversion process, gamma processing, and halftone processing. Examples of the characteristics of the printing apparatus are the color reproducibility, the dot gain, and the gamma characteristic. Examples of the scanner characteristics are the color reproducibility and the scanner MTF.

When these influences are removed and there is no image anomaly, various kinds of processes are performed on both the scanned image data and the reference image data or on only the reference image data so as to eliminate the difference between them. The various kinds of processes include a color conversion process, a gamma correction process, filter processing (for adjusting descreening and rounding), and the adjustment of the bit width. When processing only the reference image data, image data equal to the scanned image data is created from the reference image data by simulation. This is equivalent to simulating the characteristics of a printing apparatus and a scanner having no image anomaly.

Japanese Patent Laid-Open No. 2015-53561 describes a technique of approximating a reference image to a scanned image by performing a correction process on reference image data.

In this related art, however, the correction process is performed on only reference image data, so it is difficult to reproduce irregular noise or sudden noise produced in a printing step or a reading step and contained in scanned image data. Consequently, the related art produces a difference between the scanned image data and the reference image data, and this may decrease the accuracy of quality inspection.

SUMMARY

Embodiments of the present disclosure eliminate the above-mentioned issues with conventional technology.

A feature of embodiments of the present disclosure is to provide a technique that prevents a decrease in accuracy of quality inspection by reducing the influence of a difference produced between a scanned image and a reference image.

According to embodiments of the present disclosure, there is provided an inspection apparatus comprising one or more controllers including one or more processors and one or more memories, the one or more controllers being configured to: obtain a scanned image by reading a printed product; calculate a weighting factor of a weighting filter based on differences between a value of a pixel of interest in a reference image used in creation of the printed product and values of peripheral pixels of the pixel of interest; perform filter processing by using the weighting filter having the weighting factor, with respect to a pixel of interest in the scanned image, which corresponds to the pixel of interest in the reference image, thereby shifting the pixel of interest in the scanned image, and create an inspection target image by calculating the weighting factor and performing the filter processing with respect to the shifted pixel of interest; and inspect quality of the printed product by collating the inspection target image with the reference image.

According to embodiments of the present disclosure, there is provided an inspection system comprising: a printing apparatus; and an inspection apparatus comprising one or more controllers including one or more processors and one or more memories, the one or more controllers being configured to: obtain a scanned image by reading a printed product; calculate a weighting factor of a weighting filter based on a difference between a value of a pixel of interest in a reference image used in creation of the printed product and values of peripheral pixels of the pixel of interest; perform filter processing by using the weighting filter having the weighting factor, with respect to a pixel of interest in the scanned image, which corresponds to the pixel of interest in the reference image, thereby shifting the pixel of interest in the scanned image, and create an inspection target image by calculating the weighting factor and performing the filter processing with respect to the shifted pixel of interest; and inspect quality of the printed product by collating the inspection target image with the reference image.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 1 depicts a view showing a configuration example of a print system including an inspection apparatus according to a first embodiment of the present disclosure.

FIG. 2 is a block diagram for explaining the hardware configuration of an image forming apparatus according to the first embodiment.

FIG. 6 is a flowchart for explaining an inspection process to be performed by the inspection apparatus according to the first embodiment.

FIG. 7 is a block diagram for explaining the functional modules of an inspection image difference adjustment unit of the inspection apparatus controller according to the first embodiment.

FIG. 11 is a flowchart for explaining a collating process to be performed by a collating unit of an inspection processing unit according to the first embodiment.

DESCRIPTION OF THE EMBODIMENTS

Figure 3:
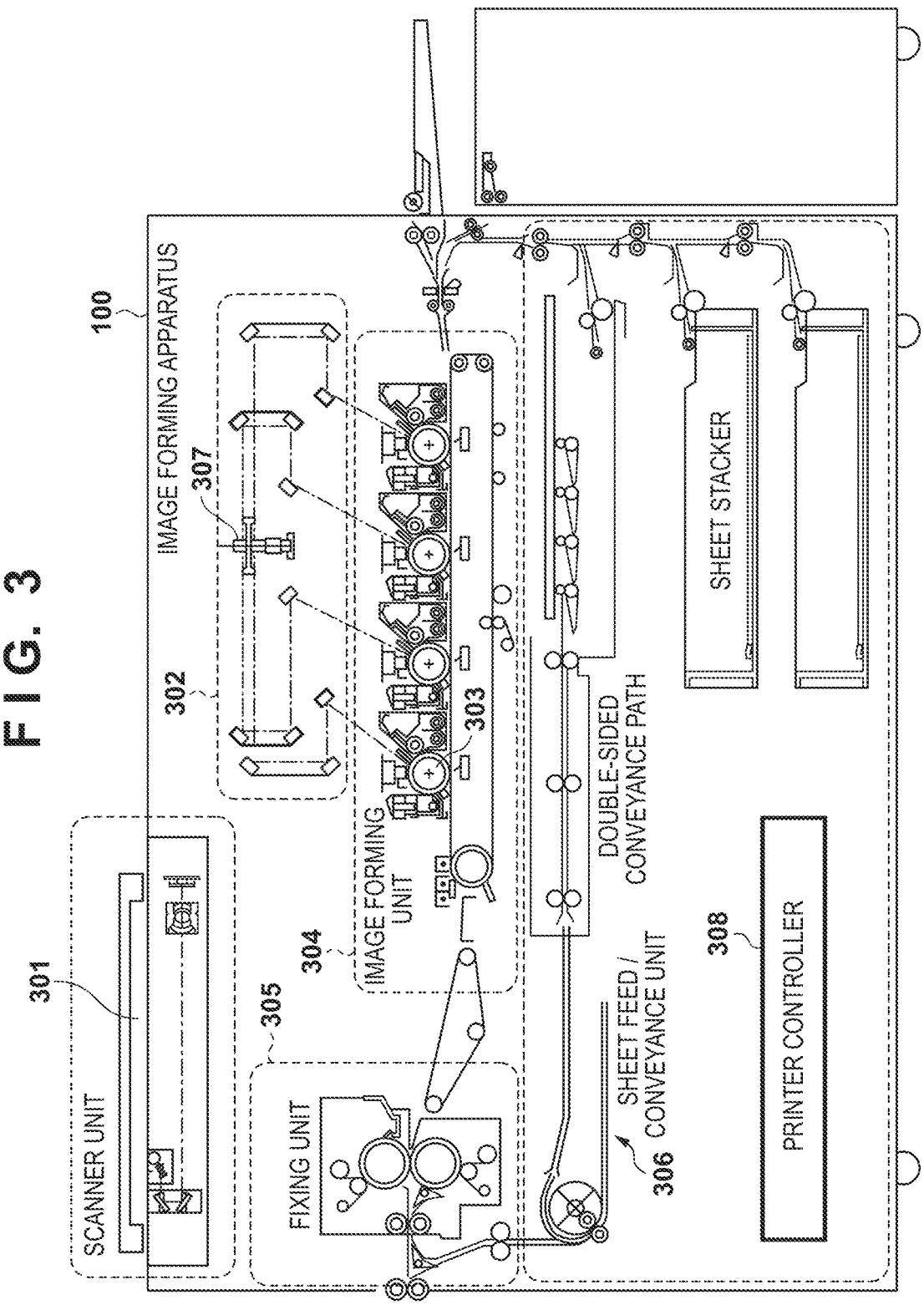
FIG. 3 depicts a view for explaining the configuration of a printer unit of the image forming apparatus according to the first embodiment.

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure.

In the first embodiment to be explained below, an inspection apparatus for inspecting the quality of an image of a printed product by reading the printed product will be explained. This inspection apparatus creates guide image data (to be referred to as a guide image hereinafter) from reference image data (to be referred to as a reference image hereinafter). Then, the inspection apparatus adjusts the image quality while referring to the guide image, so that scanned image data (to be referred to as a scanned image or an inspection target image hereinafter) approximates to the reference image. A method of thus reducing the difference between the scanned image and the reference image will be explained below. The reference image is used as the guide image because the scanned image is affected by the characteristics of a printing apparatus and the characteristics of a scanner and hence contains irregular noise and the like, so accurate positions of edges are not detected. When accurate positions of edges are not detected, an image correction process cannot correctly be performed, and this makes it difficult to approximate the scanned image to the reference image.

On the other hand, the guide image created from the reference image is not affected by the characteristics of the printing apparatus and the characteristics of the scanner, so a correction process based on accurate positions of edges can be performed. This can accurately approximate the scanned image to the reference image.

First Embodiment

FIG. 1 depicts a view showing a configuration example of an inspection system including an inspection apparatus according to the first embodiment of the present disclosure.

An image forming apparatus (printing apparatus) 100 processes various kinds of input data and performs printing on a recording medium such as paper or a sheet, thereby creating a printed product. An inspection apparatus 200 receives the printed product output from the image forming apparatus 100, and inspects the contents of the printed product. A finisher 300 receives the printed products inspected by the inspection apparatus 200, and performs post processing such as bookbinding, binding, or punching. The image forming apparatus 100 is connected to an external print server or an external client PC across a network. The inspection apparatus 200 is connected one-to-one to the image forming apparatus 100 via a communication cable. The finisher 300 is also connected one-to-one to the image forming apparatus 100 via another communication cable. Furthermore, the inspection apparatus 200 and the finisher 300 are connected to each other via a still another communication cable. The first embodiment shows an example of an in-line inspection system that consistently performs image formation, image inspection, and finishing.

FIG. 2 is a block diagram for explaining the hardware configuration of the image forming apparatus 100 according to the first embodiment.

The image forming apparatus 100 includes a controller (control unit) 21, a printer unit 206, and a user interface (UI) unit (console unit) 23. Note that the UI unit 23 includes various switches for operations, LEDs, displays, and the like.

Image data or document data to be transmitted to the image forming apparatus 100 is generated by a client PC on a network or a software application such as a printer driver (not shown) on a print server. This image data or document data is transmitted as Page Description Language (PDL) data to the image forming apparatus 100 across a network (for example, Local Area Network). In the image forming apparatus 100, the controller 21 receives the transmitted PDL data.

The controller 21 is connected to the UI unit 23 and the printer unit 206, receives the PDL data transmitted from the client PC or the print server, converts the PDL data into print data processable by the printer unit 206, and outputs the print data to the printer unit 206. The printer unit 206 prints an image based on the print data output from the controller 21. Note that the printer unit 206 according to the first embodiment has a print engine complying with an electrophotographic method. However, the printing method is not limited to this and may also be an inkjet method or the like.

The UI unit 23 is operated by the user and used to select various functions and designate operations. The UI unit 23 includes, for example, a display having a touch panel on its surface, and a keyboard on which various keys such as a start key, a stop key, and ten keys are arranged.

Details of the controller 21 will be explained below.

The controller 21 includes a network I/F (interface) unit 101, a CPU 102, a RAM 103, a ROM 104, an image processing unit 105, an engine I/F unit 106, and an internal bus 107. The network I/F unit 101 receives PDL data transmitted from a client PC or a print server across a network. The CPU 102 controls the whole image forming apparatus 100 and executes processing (to be described later) to be performed by the controller 21, by using programs and data stored in the RAM 103 and the ROM 104. The RAM 103 has a work area to be used by the CPU 102 to execute various processes. The ROM 104 stores the programs and data for causing the CPU 102 to execute various processes (to be described later), and setting data of the controller 21.

The image processing unit 105 performs, in accordance with settings from the CPU 102, image processing for printing on the PDL data received by the network I/F unit 101, thereby creating print data that can be processed and output by the printer unit 206. In particular, the image processing unit 105 creates image data having a plurality of color components per pixel by rasterizing the received PDL data. The plurality of color components herein mentioned are color components independent of each other in a color space such as RGB (Red, Green, and Blue). The image data has an 8-bit (256-grayscale) value for one color component per pixel. That is, the image data is multivalued bitmap data containing multivalued pixel data. In addition to the image data, the abovementioned rasterization creates attribute data indicating the attribute of each pixel of the image data. This attribute data indicates the type of object to which a pixel belongs, and is a value indicating the type of object such as a character, a line, graphic, an image, or a background. By using the created image data and attribute data, the image processing unit 105 creates print data by performing image processing such as color conversion from the RGB color space to a CMYK (Cyan, Magenta, Yellow, and Black) color space, and a screening process. The engine I/F unit 106 is an interface that outputs the print data created by the image processing unit 105 to the printer unit 206. The internal bus 107 is a system bus for connecting the above-described units.

FIG. 3 depicts a view for explaining the configuration of the printer unit 206 of the image forming apparatus 100 according to the first embodiment.

The image forming apparatus 100 includes a scanner unit 301, a laser exposure unit 302, a photosensitive drum 303, an image forming unit 304, a fixing unit 305, a sheet feed/conveyance unit 306, and a printer controller 308 for controlling these units. The scanner unit 301 optically reads an image on an original placed on an original table by illuminating the original, and forms image data by converting the image into an electrical signal.

The laser exposure unit 302 applies a light beam such as a laser beam modulated in accordance with the image data to a rotary polygon mirror 307 that rotates at a constant angular speed, and illuminates the photosensitive drum 303 with the reflected light as scanning light. The image forming unit 304 rotates the photosensitive drum 303, charges the photosensitive drum 303 by using a charger, and develops a latent image formed on the photosensitive drum 303 by the laser exposure unit 302 by using toner. The image forming unit 304 transfers the toner image onto a sheet, and collects a small amount of toner that is not transferred but remains on the photosensitive drum 303. The image forming unit 304 is implemented by using four developing units (developing stations) performing the series of electrophotographic processes described above.

The four developing units arranged in the order of cyan (C), magenta (M), yellow (Y), and black (K) execute the image forming operation in the order of magenta, yellow, and black after a predetermined time has elapsed since image forming in the cyan station started.

The fixing unit 305 includes combinations of rollers and belts. A heating roller incorporates a heat source such as a halogen heater, and melts the toner image transferred onto a sheet by the image forming unit 304 with heat and pressure, thereby fixing the toner image on the sheet. Note that when performing printing on a thick sheet, the conductivity of heat is low because the sheet is thick, so the conveyance speed of the sheet passing the fixing unit 305 must be decreased to, for example, half of a normal speed. When performing printing on a thick sheet, therefore, the conveyance speed of the sheet in each unit other than the fixing unit 305 is also decreased to half, so the printing speed itself of the image forming apparatus 100 is decreased to half.

The sheet feed/conveyance unit 306 includes one or more sheet stackers such as sheet cassettes or paper decks. In accordance with an instruction from the printer controller 308, the sheet feed/conveyance unit 306 separates one of a plurality of sheets stacked in the sheet stacker, and conveys the sheet to the image forming unit 304. Furthermore, the sheet feed/conveyance unit 306 conveys the sheet onto which a toner image is transferred by the image forming unit 304 to the fixing unit 305. The sheet is thus conveyed, the above-described developing stations transfer toner images of their respective colors, and a full-color toner image is finally formed on the sheet. When forming images on two surfaces of a sheet, control is so performed that a sheet having passed the fixing unit 305 is supplied to a conveyance path through which the sheet is again conveyed to the image forming unit 304.

The printer controller 308 communicates with the controller 21 that controls the whole image forming apparatus 100, and executes control in accordance with an instruction therefrom. Also, the printer controller 308 manages the states of the scanner unit 301, the laser exposure unit 302, the image forming unit 304, the fixing unit 305, and the sheet feed/conveyance unit 306 described above, and gives instructions to these units so that they can smoothly operate while maintaining harmony as a whole.

Figure 4A:
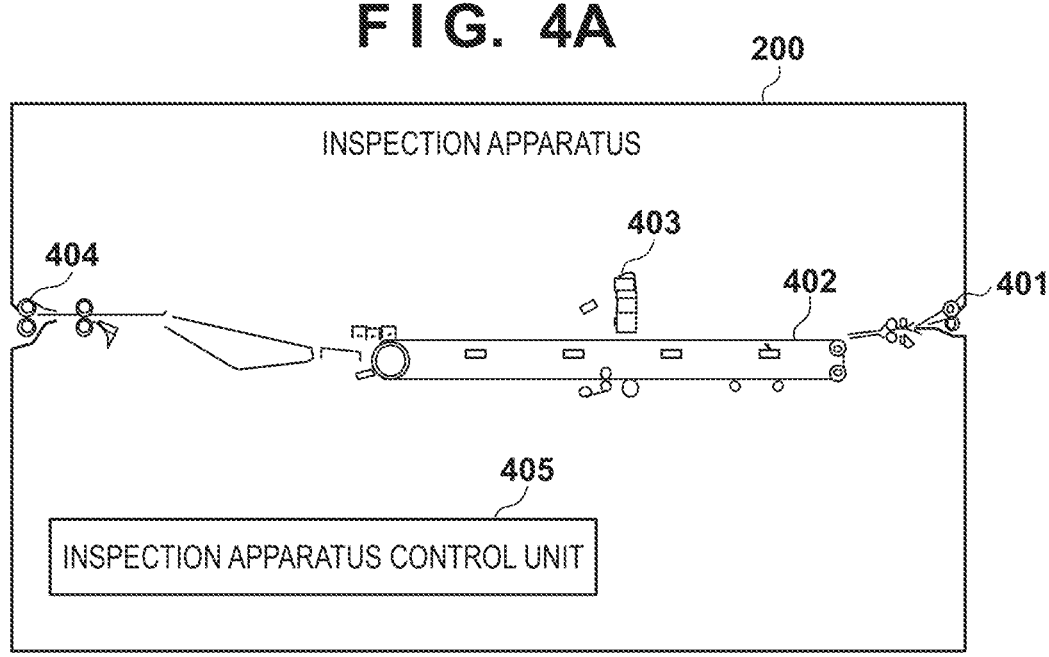
FIG. 4A depicts a schematic view for explaining the internal arrangement of an inspection apparatus according to the first embodiment.

FIG. 4A depicts a schematic view for explaining the internal arrangement of the inspection apparatus 200 according to the first embodiment.

A sheet (printed product) printed and discharged by the image forming apparatus 100 is drawn into the inspection apparatus 200 by sheet feed rollers 401. After that, the printed product is conveyed by a conveyor belt 402 and read by an inspection sensor 403 installed above the conveyor belt 402. An inspection apparatus control unit 405 performs an inspection process by using image data (a scanned image) read by the inspection sensor 403. The inspection apparatus control unit 405 also controls the whole inspection apparatus 200. Then, the inspection result of this inspection process is supplied to the finisher 300 in the output stage. Sheet discharge rollers 404 discharge the printed product thus inspected. Note that although not shown, the inspection sensor 403 can also have a structure that performs reading from below the conveyor belt 402 so that a double-sided printed product can be read.

Figure 4B:
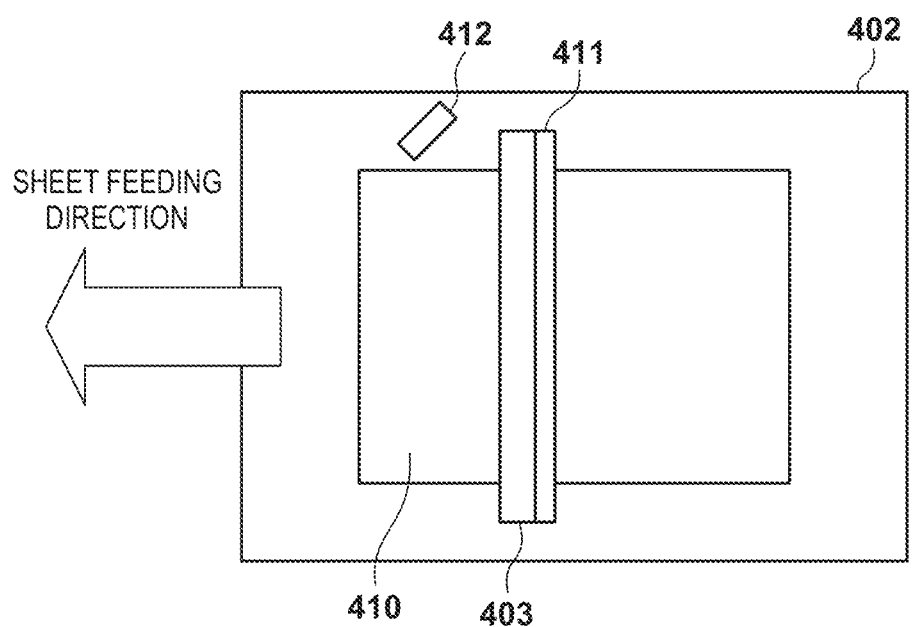
FIG. 4B depicts a top view showing a conveyor belt from the side of an inspection sensor.

FIG. 4B depicts a top view showing the conveyor belt 402 from the side of the inspection sensor 403.

As shown in FIG. 4B, the inspection sensor 403 is a line sensor that reads each line of an image on the entire surface of a conveyed printed product 410. An irradiation unit 411 for image reading irradiates the printed product to be read by the inspection sensor 403. An irradiation unit 412 for skew feeding detection is used to detect whether the printed product 410 being conveyed on the conveyor belt 402 diagonally moves in the conveyance direction. The skew feeding detection irradiation unit 412 diagonally irradiates the printed product 410 being conveyed, thereby reading an image of the shadow of an edge of the printed product and detecting skew feeding. In the first embodiment, the inspection sensor 403 reads the shadow image of an edge of the printed product. However, this may also be performed by a read sensor other than the inspection sensor 403.

Figure 5:
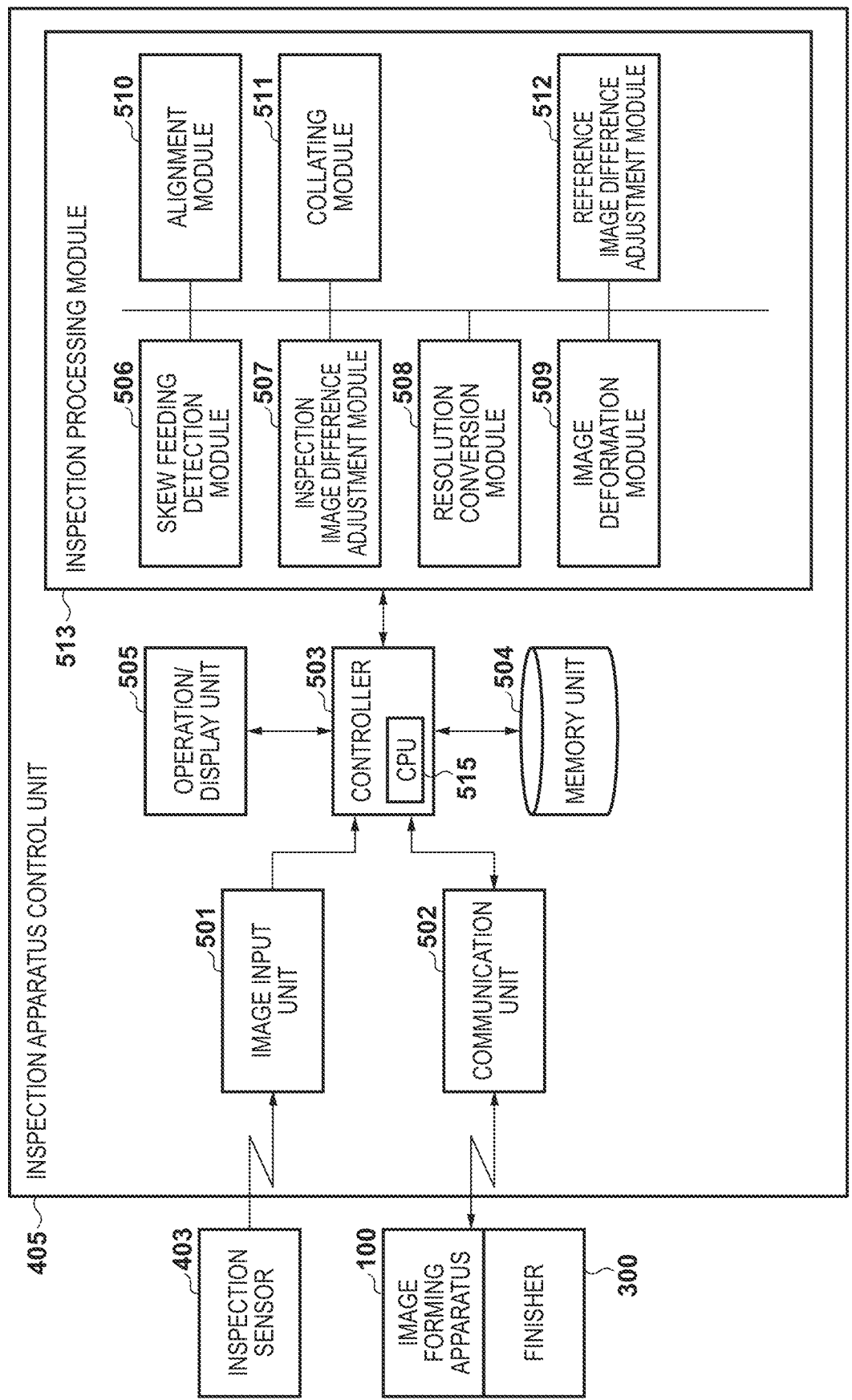
FIG. 5 is a block diagram for explaining the functional configuration of an inspection apparatus controller of the inspection apparatus according to the first embodiment.

FIG. 5 is a block diagram for explaining the functional configuration of the inspection apparatus control unit 405 of the inspection apparatus 200 according to the first embodiment.

A controller 503 controls the whole inspection apparatus control unit 405. The controller 503 has a CPU 515. The CPU 515 executes programs deployed on a memory 504, thereby executing various processes to be described later. An image input unit 501 receives a scanned image read by the inspection sensor 403. The CPU 515 saves the received scanned image in the memory 504. A communication unit 502 communicates with the controller 21 of the image forming apparatus 100. This communication includes reception of image data (a reference image) corresponding to the scanned image and used in printing, and transmission/reception of inspection control information. The CPU 515 saves the received reference image and inspection control information in the memory 504.

One of the pieces of inspection control information to be exchanged with respect to the image forming apparatus 100 is synchronization information for obtaining correspondence between the scanned image and the reference image, such as print job information, print copies information, or page order information. Other information contains inspection result information, and control information for controlling the operation of the image forming apparatus 100 in accordance with the inspection result information. When performing double-sided printing or printing a plurality of copies, the inspection control apparatus 405 receives a scanned image and a reference image used to print the scanned image in different orders. In this case, the synchronization information is necessary to synchronize the reference image and an inspection target image. Also, when one reference image corresponds to a plurality of scanned images, the synchronization information is necessary to synchronize the reference image and the scanned images. The inspection control information exchanged with respect to the finisher 300 contains inspection result information and control information for controlling the operation of the finisher 300 in accordance with the inspection result information.

The CPU 515 of the controller 503 controls the operation of an inspection processing module 513. Based on the synchronization information as one of the pieces of inspection control information to be exchanged with respect to the image forming apparatus 100 described above, the inspection processing module 513 sequentially performs an inspection process on a pair of a scanned image and a reference image corresponding to each other. Details of the inspection processing module 513 will be described later. When the inspection process is complete, the determination result is transmitted to the controller 503 and displayed on an operation/display unit 505. If this determination result indicates an image anomaly, the control operations of the image forming apparatus 100 and the finisher 300 are switched via the communication unit 502 by a method designated beforehand on the operation/display unit 505 by the user. For example, the image forming process by the image forming apparatus 100 is stopped, and a sheet discharge tray of the finisher 300 is switched to an escape tray.

The configuration of the inspection processing module 513 will be explained below.

A skew feeding detection module 506 is a module for detecting a skew angle of a scanned image. As described above with reference to FIG. 4B, a scanned image is so scanned as to form a shadow formed on an edge of a printed product. This is so because the inspection sensor 403 scans a shadow formed on an edge when a printed product drawn into the inspection apparatus 200 and conveyed on the conveyor belt 402 is irradiated by the skew feeding direction irradiation unit 412. The skew angle of the printed product is detected by using this shadow. Based on the skew angle thus detected, an image deformation module 509 (to be described later) performs a correction process.

An inspection image difference adjustment module 507 is a module for adjusting an image difference between a scanned image and a reference image by adjusting the scanned image. As described earlier, a scanned image is an image obtained by scanning a printed product on which a reference image is printed, so an image difference from the reference image exists even when there is no image anomaly. This difference is produced by the influence of image processing before printing, the influence of the characteristics of an image forming apparatus, and the influence of the characteristics of a scanner. Examples of the image processing before printing are a color conversion process, gamma processing, and half-tone processing. The characteristics of the image forming apparatus are color reproducibility, the dot gain, the gamma characteristic, and the like. The scanner characteristics are, for example, the color reproducibility, the S/N, and the scanner MTF. Also, the numbers of bits of the images are different in some cases. When these influences are removed and there is no image anomaly, a process for adjusting the difference between the scanned image and the reference image is performed so as to eliminate this image difference. Details of this image difference adjusting process will be described later.

A reference image difference adjustment module 512 is a module for adjusting an image difference between a scanned image and a reference image by adjusting the reference image. In this module, a process of adjusting the image quality difference in the reference image is performed so as to decrease the difference between the scanned image and the reference image. More specifically, a color conversion process, a gamma correction process, a filter processing (for reproducing rounding), bit width adjustment, and the like are performed. The processing by the reference image difference adjustment module 512 creates an image equal to the scanned image from the reference image by simulation. Accordingly, this is equivalent to simulating the characteristics of the image forming apparatus 100 having no image anomaly and the characteristics of the inspection sensor 403.

A resolution conversion module 508 is a module for converting the resolution of a scanned image or a reference image. A scanned image and a reference image sometimes may have different resolutions when they are input to the inspection apparatus control unit 405. Also, a resolution to be used by each module of the inspection processing module 513 is sometimes different from the input resolution. In cases like these, this module performs resolution conversion. Assume that a scanned image has main scanning 600 dpi/sub scanning 300 dpi and a reference image has main scanning 1,200 dpi/sub scanning 1,200 dpi. Assume also that a resolution necessary for the inspection processing module 513 is 300 dpi for both main scanning and sub scanning. In this case, reduction scaling is performed on each image so that the both images have 300 dpi for both main scanning and sub scanning. As this scaling method, a well-known method can be used by taking the calculation load and the necessary accuracy into consideration. For example, when performing scaling using the SINC function, the calculation load is heavy, but highly accurate scaling results are obtained. On the other hand, when performing scaling using the nearest neighbor algorithm, low-accuracy calculation results are obtained although the calculation load is light.

The image deformation module 509 is a module for deforming a scanned image and/or a reference image. A geometrical difference exists between a scanned image and a reference image due to, for example, expansion/contraction or skew feeding of paper during printing, or skew feeding during scanning. The image deformation module 509 corrects this geometrical difference by deforming an image based on information obtained by the skew feeding detection module 506 or an alignment module 510 (to be described later). Examples of the geometrical difference are linear transformation (rotation, expansion/reduction, or shearing) and translation. This geometrical difference can be expressed as affine transformation, and can be corrected by obtaining an affine transformation parameter from the skew feeding detection module 506 or the alignment module 510. Note that information obtainable from the skew feeding detection module 506 is only a parameter (skew angle information) related to rotation.

The alignment module 510 is a module for aligning a scanned image and a reference image based on the premise that a scanned image and a reference image to be input to this module are image data having the same resolution. Various alignment methods are possible as this alignment method. In the first embodiment, alignment is performed by a well-known image processing method. For example, alignment is performed by performing affine transformation, projective transformation, or the like such that the positions of corresponding feature points of a reference image and a scanned image match. As another method, it is possible to use generally used Sum of Squared Difference (SSD), or a well-known method such as mutual information or a cross-correlation coefficient. Also, as an image deformation model, it is possible to use a deformation model based on a radial basis function such as Thin Plate Spline (TSP), or a well-known deformation model such as Free Form Deformation (FFD) or Large Deformation Diffeomorphic Metric Mapping (LDDMM).

A collating module 511 is a module for collating a scanned image with a reference image. A scanned image and a reference image to be input to the collating module 511 are image data having the same resolution. This collation is based on the premise that a reference image or a scanned image is corrected by the image deformation module 509 based on information obtained by the alignment module 510 so that the two images can be compared. The collating module 511 forms a collation image by using the reference image and the scanned image. Then, the collating module 511 performs a collation process based on a parameter notified from the operation/display unit 505. The collating module 511 creates a difference image from the difference between the reference image and the scanned image, and creates a collation image by applying a filter for emphasizing a specific shape to the difference image. Then, the collating module 511 binarizes the collation image by comparing the collation image with the parameter notified from the operation/display unit 505. It is determined that a pixel found to be "1" after the binarization is a defective pixel. Details of the collation process will be descried later.

FIG. 6 is a flowchart for explaining the inspection process by the inspection apparatus 200 according to the first embodiment. Note that a program for executing this flowchart is saved in the memory 504, and the CPU 515 of the controller 503 achieves processing indicated by this flowchart by executing the program. Note also that the result of processing by each processing unit is held in the memory 504 and used in subsequent processing.

In step S601, the CPU 515 aligns a scanned image and a reference image. The CPU 515 selects an image pair of a scanned image and a reference image to be processed, by using inspection control information received from the image forming apparatus 100 and held in the memory 504 via the communication unit 502. Then, the CPU 515 causes the resolution conversion module 508 to convert the resolution of the scanned image and reference image to a predetermined resolution (for example, 300 dpi×300 dpi) if the resolution of the scanned image and reference image is different from the predetermined resolution. The CPU 515 causes the alignment module 510 to process the scanned image and reference image given the predetermined resolution, thereby obtaining an affine transformation parameter. Then, the CPU 515 causes the image deformation module 509 to correct the reference image by using the affine transformation parameter obtained from the alignment module 510, thereby giving the reference image the same coordinate system as that of the scanned image and obtaining image data usable in collation.

Next, in step S602, the CPU 515 performs an image correction process for an inspection process. In this step, the CPU 515 causes the inspection image difference adjustment module 507 to adjust the image quality difference in the scanned image, thereby changing the scanned image into an image suitable for the inspection process. In parallel, the CPU 515 causes the reference image difference adjustment module 512 to adjust the image quality difference in the reference image, thereby changing the reference image into an image suitable for the inspection process.

In step S603, the CPU 515 performs a collation process by using the scanned image and the reference image obtained in step S602. In this step, the CPU 515 causes the collating module 511 to process the scanned image and the reference image.

In step S604, the CPU 515 displays the result of the inspection process on the operation/display unit 505. If only the final determination result is simply displayed, it is difficult to grasp what kind of image anomaly has occurred. Therefore, the operation/display unit 505 displays the final determination result by synthesizing an image indicating the final determination result on the scanned image. In this synthesis, any synthetic method can be used as long as the location of an image anomaly is easy to grasp. For example, in the final determination result image, a portion of "1" (an abnormal pixel) is displayed by a conspicuous color such as red in the scanned image.

FIG. 7 is a block diagram for explaining the functional modules of the inspection image difference adjustment module 507 of the inspection apparatus control unit 405 according to the first embodiment.

A guide image creation module 701 is a module for creating a guide image from a reference image. A weighting filter calculation module 702 is a module for calculating the weight of a reference pixel based on the guide image. A weighting filter processing module 703 is a module for performing weighting filter processing on a pixel of interest and peripheral pixels in a scanned image by using a weighting filter.

Figures 8, 9A, 9B:
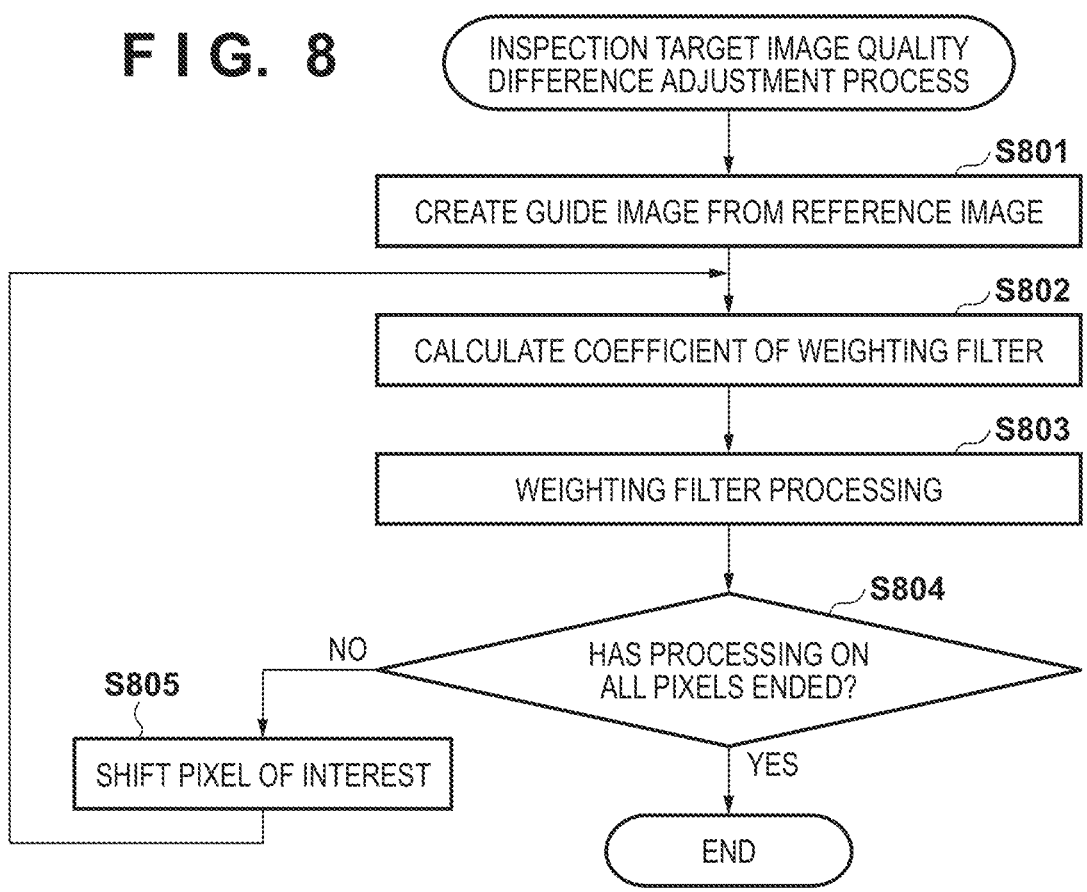
FIG. 8 is a flowchart for explaining the processing of the inspection image difference adjustment unit according to the first embodiment.
FIGS. 9A and 9B depict views for explaining a weighting filter according to the first embodiment.

The processing of the inspection image difference adjustment module 507 according to the first embodiment will be explained below with reference to FIGS. 8, 9, and 10A to 10D. A program that causes the CPU 515 of the controller 503 to execute the processing indicated by a flowchart shown in FIG. 8 is saved in the memory 504. Also, the result of processing by each processing module is held in the memory 504 and used in subsequent processing.

FIG. 8 is a flowchart for explaining the processing of the inspection image difference adjustment module 507 according to the first embodiment. FIGS. 9A and 9B depict views for explaining a filter. FIGS. 10A to 10D depict views for explaining a process of adjusting the image quality difference of a scanned image. Note that in FIGS. 10A to 10D, the ordinate indicates a signal value of a pixel, and the abscissa indicates a pixel position. Note also that both a reference image and a scanned image are images having RGB color components, and the R component will be focused and explained in FIGS. 10A to 10D.

Figure 10A:
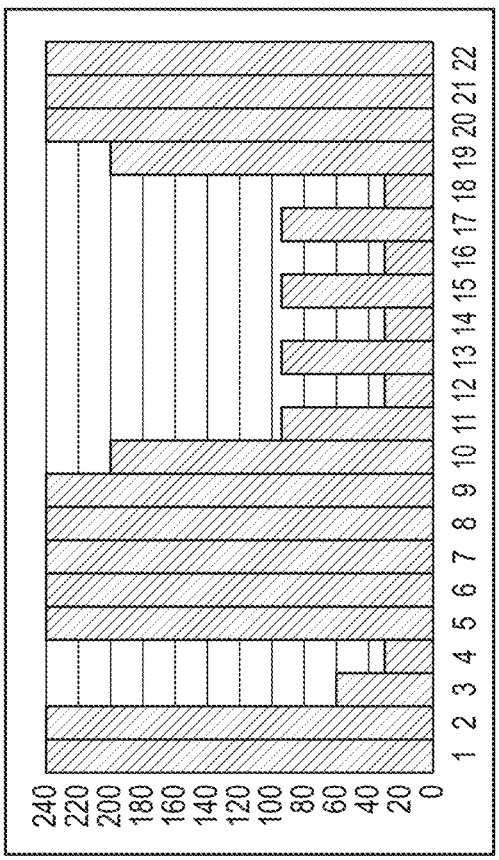
FIGS. 10A to 10D depict views for explaining a process of adjusting the quality difference of an inspection target image in the first embodiment.

FIG. 10A shows the section of the R component of a given y-axis in the reference image. Pixels having a signal value of 240 indicate white. FIG. 10A shows that an object having a signal value of 64 exists in pixel positions 11 to 18.

Figure 10B:
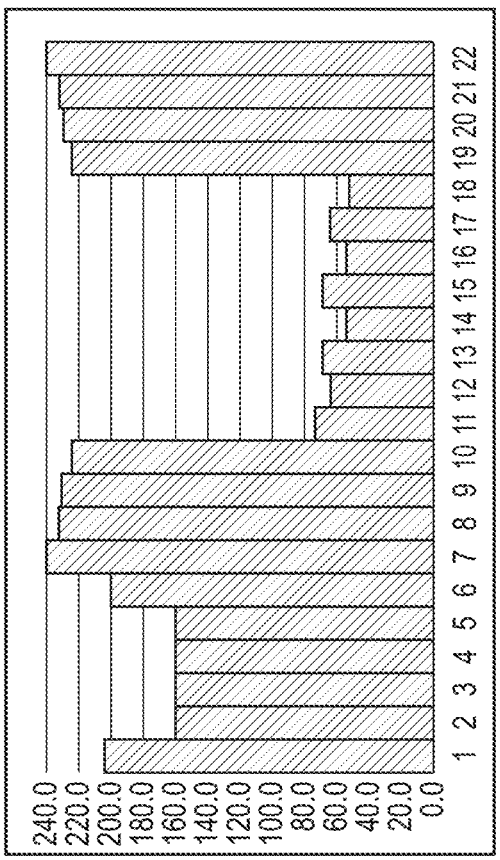

FIG. 10B shows the section of the R component of a given y-axis in the scanned image. Pixels having a signal value of 240 indicate a blank paper portion of the storage medium. Pixel positions 3 and 4 have anomaly, so the signal values are lower than peripheral signal values. Pixel positions 10 to 19 indicate a portion obtained by reading an image obtained by printing the object in the pixel positions 11 to 18 in FIG. 10A. Ups and downs of signals in the pixel positions 11 to 18 are produced because the halftone is binarized by halftone processing and a halftone dot structure is formed.

Accordingly, if this halftone dot structure remains, a difference is produced between the reference image and the scanned image. This makes it important to reduce the difference between the reference image and the scanned image by smoothing the halftone dot structure by filter processing.

Figure 10C:
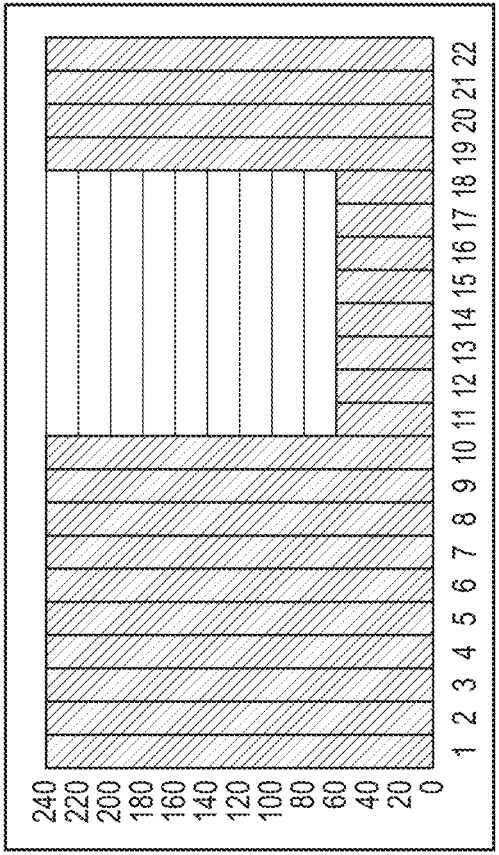
Figure 10D:
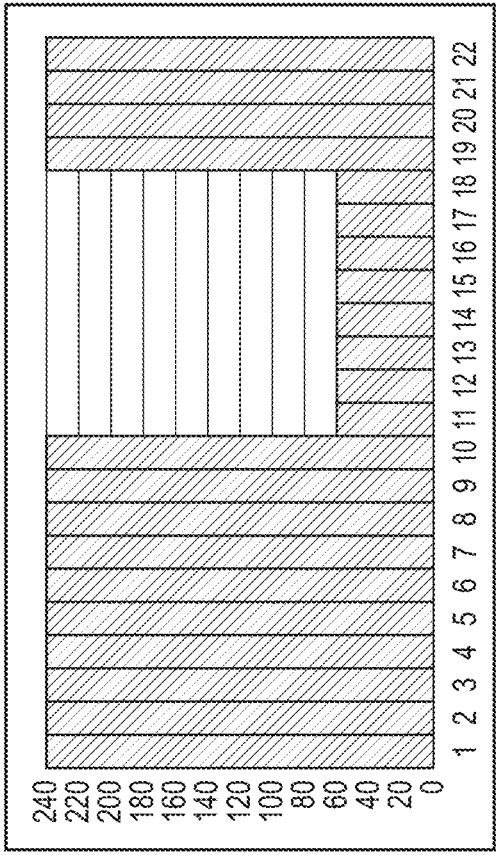

FIG. 10C depicts a view showing the section of a given y-axis of a guide image created from the reference image. FIG. 10D shows a corrected scanned image obtained by applying weighting filter processing to the scanned image.

In step S801, the CPU 515 functions as the guide image creation module 701 and creates a guide image from the reference image. In the first embodiment, the guide image is created by a weighted average using the NTSC coefficient. Note that the creation of the guide image is not limited to this, and another grayscale conversion method may also be used. This guide image is desirably created by conversion by which the distances between the color of a pixel of interest and respective colors of reference pixels are known.

More specifically, the guide image is created by using equation (1) below:

$$Y = 0.299 \times R + 0.587 \times G + 0.114 \times B \quad (1)$$

In step S802, the CPU 515 functions as the weighting filter calculation module 702, and calculates the weighting factors of a weighting filter from the guide image. In the first embodiment, a weight W1 is calculated from the differences between a pixel of interest and reference pixels as an example. More specifically, the weighting factors of peripheral pixels of the pixel of interest are calculated by using equation (2) below. Note that abs( ) is a function for calculating an absolute value.

$$W_1(x, y, n, m) = 1 - \frac{\text{abs}(z(x, y) - z(x+n, y+m))}{255} \times \text{gain} \quad (2)$$

where z is the pixel value of the guide image, x and y indicate a pixel position, and x+n and y+m indicate pixel positions within the filter range.

In the first embodiment, processing is two-dimensionally performed by setting the lateral direction of the image as x and the longitudinal direction thereof as y. To simplify the explanation, however, a case in which a pixel of interest, two pixels to the left of the pixel of interest, and two pixels to the right of the pixel of interest, that is, a total of five pixels are referred to as reference pixels will be explained as an example.

Note that the absolute value of the difference between pixels is divided by 255 in order to normalize the difference amount. Note also that the gain is a predetermined value and 1.5 in the first embodiment. This gain is adjusted by, for example, the dynamic range of reading. Furthermore, the result of the division of the absolute value is subtracted from 1 in equation (2) above in order to increase the weight when the pixel value difference is small, and decrease the weight when the difference is large. Accordingly, the weight calculating method is, of course, not limited to equation (2) above but need only be a method that calculates the weight by the difference of pixel values.

The calculation of the coefficients of the weighting filter will be explained in detail below with reference to FIG. 10C.

The explanation will be made by taking an example in which the weight W1 of each of peripheral pixels is calculated when the position of a pixel of interest is the pixel position 10. Since the explanation will be made by using only the x-axis, y=0 and m=0 always hold, so an explanation thereof will be omitted.

The weight W1 of the second pixel to the left of the pixel of interest is given by:

weight $W1(10,-2)=1-(\text{abs}(z[10]-z[8])/255\times\text{gain})=1-(\text{abs}(240-240)/255\times1.5)=1$ The weight W1 of the first pixel to the left of the pixel of interest is given by:

weight $W1(10,-1)=1-(\text{abs}(z[10]-z[9])/255\times\text{gain})=1-(\text{abs}(240-240)/255\times1.5)=1$ The weight W1 of the pixel of interest is given by:

weight $W1(10,0)=1-(\text{abs}(z[10]-z[10])/255\times\text{gain})=1-(\text{abs}(240-240)/255\times1.5)=1$ The weight W1 of the first pixel to the right of the pixel of interest is given by:

weight $W1(10,1)=1-(\text{abs}(z[10]-z[11])/255\times\text{gain})=1-(\text{abs}(240-64)/255\times1.5)=1-(176/255\times1.5)=1-(0.6902\times1.5)=1-1.04$(round off to the second decimal place)$=-0.04$ The weight W1 of the second pixel to the right of the pixel of interest is given by:

weight $W1(10,2)=1-(\text{abs}(z[10]-z[12])/255\times\text{gain})=1-(\text{abs}(240-64)/255\times1.5)=1-(176/255\times1.5)=1-(0.6902\times1.5)=1-1.04$(round off to the second decimal place)$=-0.04$ In this calculation, no accurate correction value is output if the weight W1 falls within a given range. To avoid this, the weight W1 is clipped within a predetermined range. Assume that this predetermined range has an upper limit of 1 and a lower limit of 0. Therefore, the weight W1(10,1) and the weight W1(10,2) are 0. Thus, the weight is as large as 1 in the pixel positions 8 and 9 whose pixel values are close to the pixel value of the pixel of interest (the pixel position 10). By contrast, the weight is 0 in the pixel positions 11 and 12 whose pixel values are far from the pixel value of the pixel of interest (the pixel position 10).

In step S803, the CPU 515 functions as the weighting filter processing module 703, and performs weighting filter processing. More specifically, the CPU 515 performs the weighting filter processing by using equation (3) below:

$$g(x, y) = \frac{\sum_n \sum_m W_s(n, m) W_i(x, y, n, m) h(x, y)}{\sum_n \sum_m W_s(n, m) W_i(x, y, n, m)} \quad (3)$$

where g is the pixel value of a target after the filter processing, h is the pixel value of the target before the filter processing, x and y indicate a pixel potion, n and m indicate pixel positions within the filter range, Ws is a function for determining a weight based on a spatial distance, and W1 is a function for determining a weight based on a pixel value difference of the guide image.

Generally, the function Ws is so set as to decrease the weight as the distance increases. Also, the function W1 is so set as to decrease the weight as the pixel value difference increases.

Next, weighting filter processing when the position of a pixel of interest is the pixel position 10 will be explained.

First, as described above, the weights of peripheral pixels of the pixel position 10 are weight W1(10,−2)=1, weight W1(10,−1)=1, weight W1(10,0)=1, weight W1(10,1)=0, and weight W1(10,2)=0.

The weight Ws in the first embodiment will be explained with reference to FIGS. 9A and 9B.

FIG. 9A shows an example of a 5-pixel×5-pixel filter in which a coefficient value is set for each pixel. Referring to FIG. 9A, f is a filter coefficient value. To simplify the explanation, a case in which the filter has one dimension, that is, the x-axis will be explained. In the first embodiment, therefore, a case using a filter shown in FIG. 9B will be explained. All coefficient values are 0.2.

First, the numerator of equation (3) above is calculated.

ΣWs×W1×h=Ws[−2]×w1(10,−2)×h[8]+Ws[−1]×W1
(10,−1)×h[9]+Ws[0]×W1(10,0)×h[10]+Ws[1]×
W1(10,1)×h[11]+Ws[2]×W1(10,2)×h[12]+=0.2×
1×240+0.2×1×240+0.2×1×200+0.2×0×96+0.2×
0×32=48+48+40+0+0=136

Then, the denominator of equation (3) above is calculated.

ΣWs×W1=Ws[−2]×W1(10,−2)+Ws[−1]×W1(10,−1)+
Ws[0]×W1(10,0)+Ws[1]×W1(10,1)+Ws[2]×W1
(10,2)=0.2×1+0.2×1+0.2×1+0.2×0+0.2×0=0.2+
0.2+0.2=0.6

Finally, 136/0.6=227 is obtained by dividing the numerator by the denominator.

As shown in FIG. 10D, therefore, the pixel value of the pixel position 10 is 227.

In FIG. 10B, the pixel value of the pixel position 10 in the scanned image before correction is 200. On the other hand, the pixel value of the pixel position 10 in the reference image is 240 as shown in FIG. 10, so there is a difference of 40. When the weighting filter processing according to the first embodiment is performed, however, the pixel value of the pixel position 10 is corrected to 227 as shown in FIG. 10D, so the difference from the reference value reduces to 13. That is, the edges of the object in the pixel positions 10 and 11 are rounded in the scanned image shown in FIG. 10B, but the edges are saved by the weighting filter processing in FIG. 10D after correction.

Likewise, the difference between the scanned image and the reference image in the pixel position 12 is 32−64=−32, but the difference between the scanned image and the reference image in FIG. 10D after correction is 70−64=6, that is, the difference between absolute values decreases. FIG. 10D also shows that the weighting filter processing has reduced the signal undulations caused by the halftone dot structure found in the pixel positions 11 to 18 shown in FIG. 10B.

In step S804, the CPU 515 determines whether the above processing has been performed on all pixels. If it is determined that the processing on all pixels is not complete, the CPU 515 advances the process to step S805 to shift the pixel of interest to the next pixel, and advances to step S802 to execute the above-described processing. If it is determined in step S804 that the processing on all pixels is complete, the CPU 515 terminates the process.

Note that only the R component is explained in the first embodiment, but the processing can similarly be executed on the G and B components.

Figure 12A:
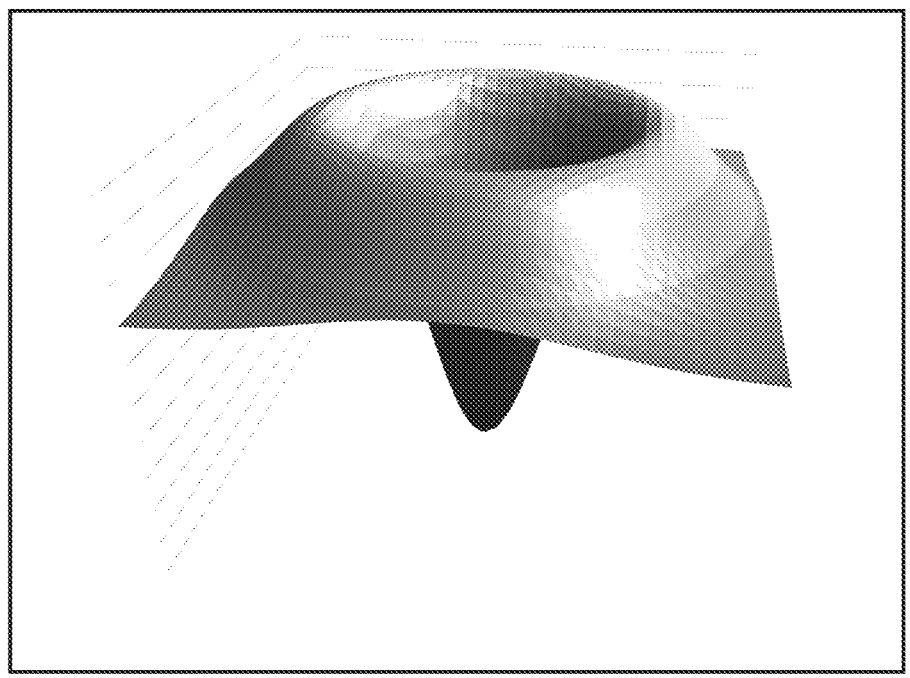
FIGS. 12A and 12B depict views showing examples of the shape of a filter for an emphasizing process according to the first embodiment.
Figure 12B:
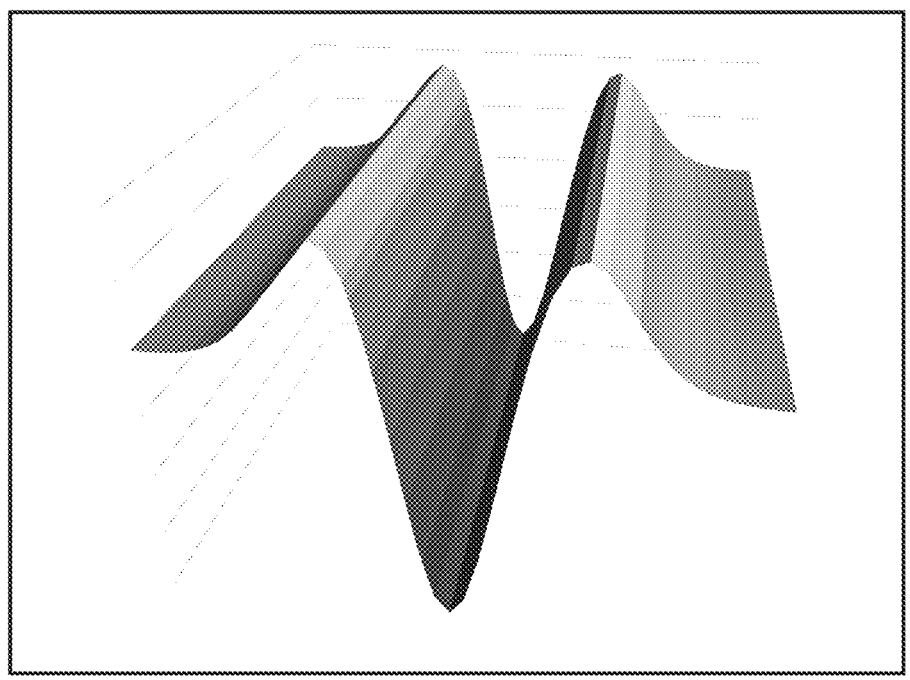

The collating process will be explained below with reference to FIGS. 11, 12A, and 12B.

FIG. 11 is a flowchart for explaining the collating process to be performed by the collating module 511 of the inspection processing module 513 of the first embodiment. FIGS. 12A and 12B depict views showing examples of the shape of a filter for an emphasizing process according to the first embodiment. Note that the processing shown in this flowchart is achieved by the CPU 515 of the controller 503 by executing a program saved in the memory 504. Note also that this collating process is performed based on a scanned image and a reference image. This process is performed on each pixel.

In step S1101, the CPU 515 functions as the collating module 511, and calculates a difference image between a reference image and a scanned image (inspection target image). For example, the CPU 515 calculates difference image DIF (x,y)=DIS(reference image (x,y)−scanned image (x,y)). In this equation, (x,y) indicates the coordinate values, and DIS( ) is a function for obtaining the distance between pixel values. For a grayscale image, DIS( ) can be a simple absolute value of the difference, and can also be a function for obtaining the absolute value of a difference taking gamma into consideration. For a color image, DIS( ) can be a function for obtaining a color difference.

In step S1102, the CPU 515 functions as the collating module 511, and performs filter processing for emphasizing a specific shape with respect to the difference image obtained in step S1101. As an example, FIG. 12A shows a filter for emphasizing a dot anomaly, and FIG. 12B shows a filter for emphasizing a linear anomaly.

In step S1103, the CPU 515 functions as the collating module 511, and performs a binarizing process on the difference image emphasized in step S1102, so that the difference value becomes "1" if it is equal to or larger than the above-described parameter, and becomes "0" if it is equal to or smaller than the parameter. As described earlier, this parameter is a parameter (threshold value) to be determined in accordance with the inspection level set on the operation/display unit 505 by the user.

In the first embodiment as explained above, a scanned image can be approximated to a reference image by performing the weighting filter processing based on a guide image created from the reference image. This makes it possible to decrease the difference between the scanned image and the reference image, which is produced by, for example, the influence of image processing before printing, the influence of the characteristics of a printing apparatus, and the influence of the characteristics of a scanner. This can reduce cases in which an image is found to be an abnormal image by mistake although there is no image anomaly.

Second Embodiment

Next, image processing according to the second embodiment of the present disclosure will be explained.

In the above first embodiment, a case in which a guide image is created from a reference image and the image quality is so adjusted as to approximate a scanned image to the reference image while referring to the guide image has been explained. By thus referring to the guide image, the edges can be saved while smoothing the halftone dot structure by using the filter. In the first embodiment, however, the filter processing is applied not only to the halftone dot structure but also to an abnormal pixel to be detected, and this may decrease the information amount of abnormal information.

In the second embodiment, therefore, a rough position of an abnormal pixel is obtained by calculating the difference in average luminance values between a scanned image and a reference image. Then, in the image quality difference adjustment process of approximating the scanned image to the reference image, the scanned image is corrected based on the difference between the average luminance values and a guide image. For example, the weight of the scanned image is increased for a pixel having a difference of luminance being greater than a predetermined value. Consequently, an abnormal pixel can be output without being deteriorated. This makes it possible to prevent a decrease in information amount of abnormal information. Note that only an inspection image difference adjustment module 507 as a difference from the first embodiment will be explained in detail below.

Figure 13:
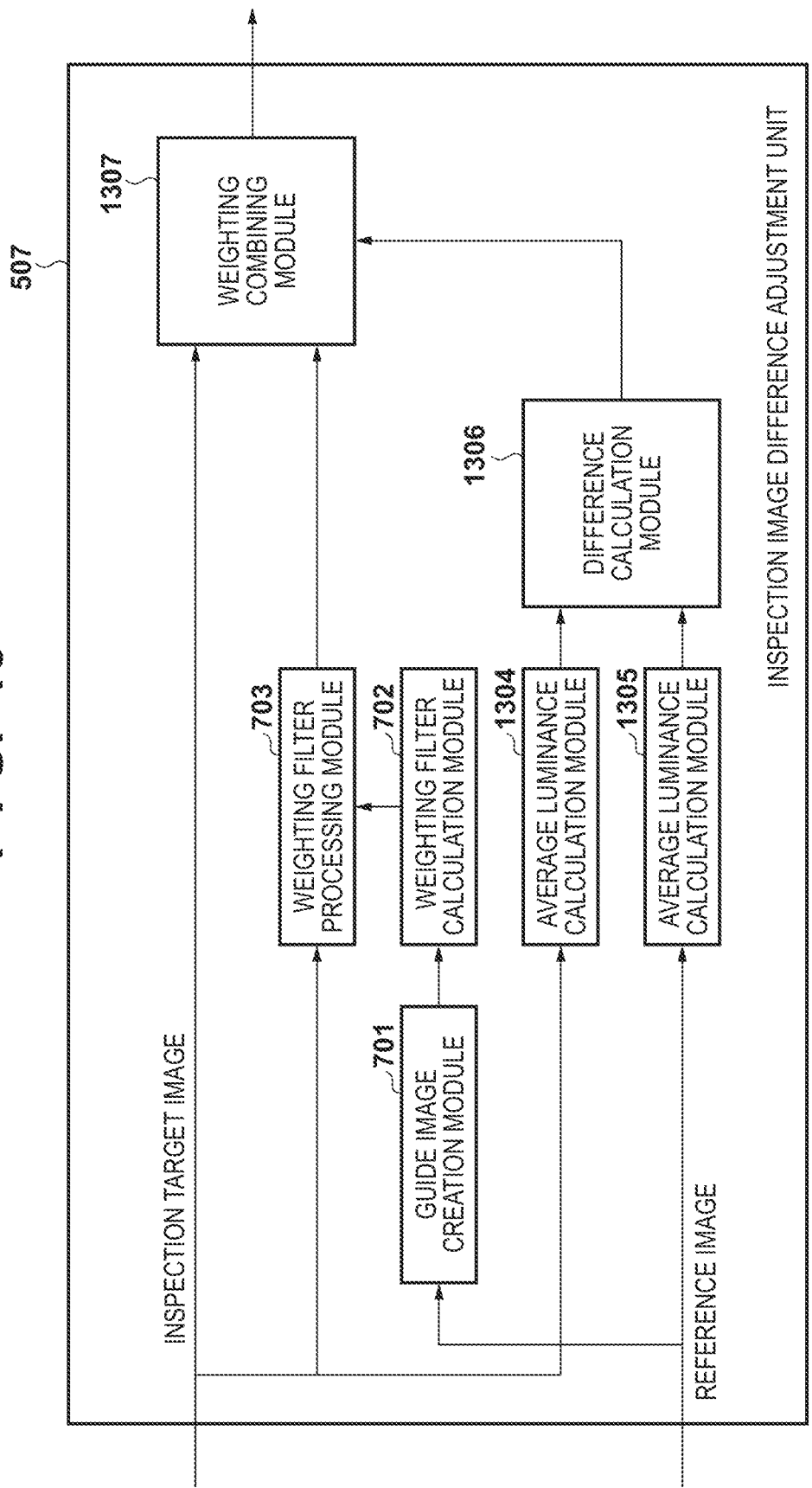
FIG. 13 is a functional block diagram for explaining the functional configuration of an inspection image difference adjustment unit according to the second embodiment.

FIG. 13 is a block diagram for explaining functional modules of the inspection image difference adjustment module 507 according to the second embodiment. Note that in FIG. 13, the same reference numerals as in FIG. 7 described earlier denote common parts, and an explanation thereof will be omitted.

An average luminance calculation module 1304 is a module for calculating the average luminance value of peripheral pixels including a pixel of interest in a scanned image. An average luminance calculation module 1305 is a module for calculating the average luminance value of peripheral pixels including a pixel of interest in a reference image. A difference calculation module 1306 is a module for calculating the difference between the average luminance value of the scanned image and that of the reference image to obtain an average luminance difference value. A weighting combining module 1307 is a module for combining the scanned image and the output image from a weighting filter processing module 703 in accordance with the average luminance difference value obtained by the difference calculation module 1306, and outputting the combined image.

Figure 14:
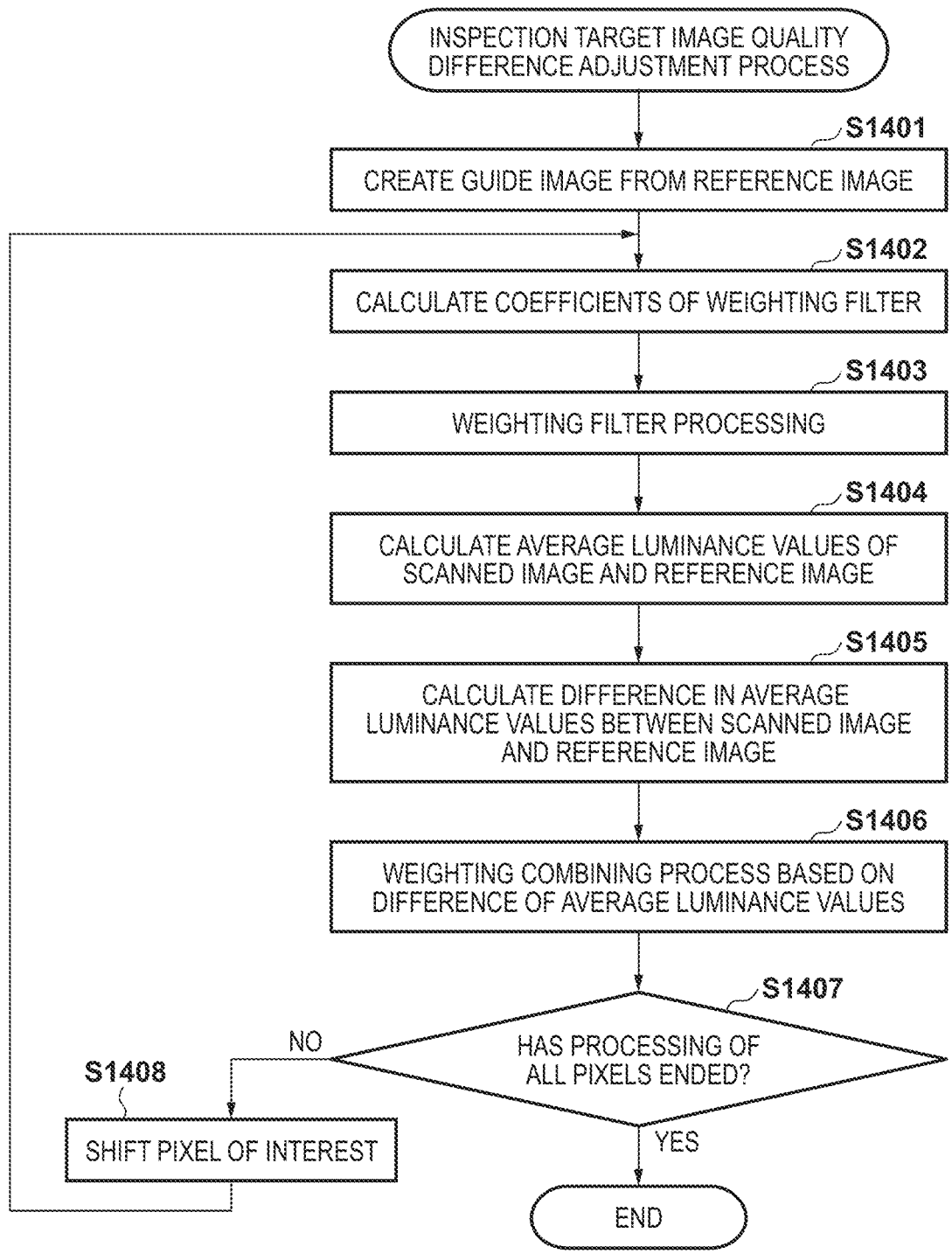
FIG. 14 is a flowchart for explaining the processing of the inspection image difference adjustment unit according to the second embodiment.

The process of adjusting the image quality difference of a scanned image according to the second embodiment will particularly be explained below with reference to FIGS. 14 and 15A to 15H. Note that a program for executing the processing shown in a flowchart of FIG. 14 is saved in a memory 504, and the processing is implemented by executing the program by a CPU 515. Note also that the result of processing by each processing unit is held in the memory 504 and used in subsequent processing.

FIG. 14 is a flowchart for explaining the processing of the inspection image difference adjustment module 507 according to the second embodiment. FIGS. 15A to 15H depict views for explaining the process of adjusting the image quality difference of a scanned image according to the second embodiment. Referring to FIGS. 15A to 15H, the ordinate indicates a signal value of a pixel, and the abscissa indicates a pixel position.

Figure 15B:
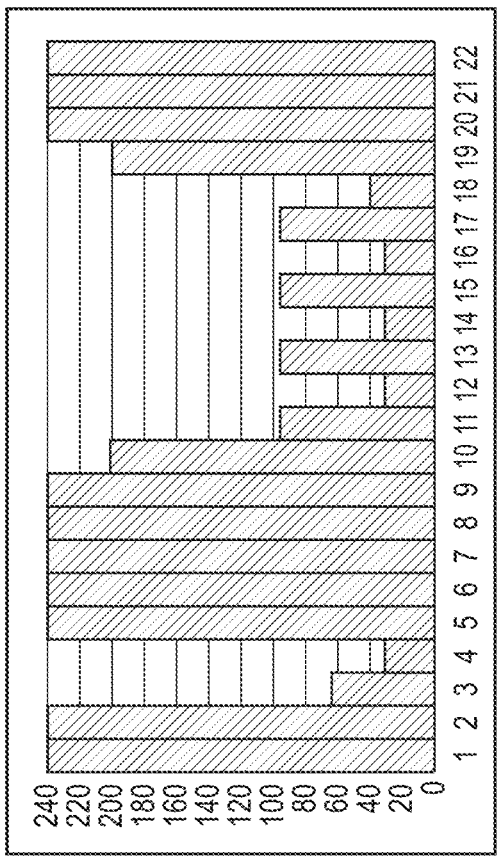
FIGS. 15A to 15H depict views for explaining a process of adjusting the quality difference of an inspection target image according to the second embodiment.
Figure 15D:
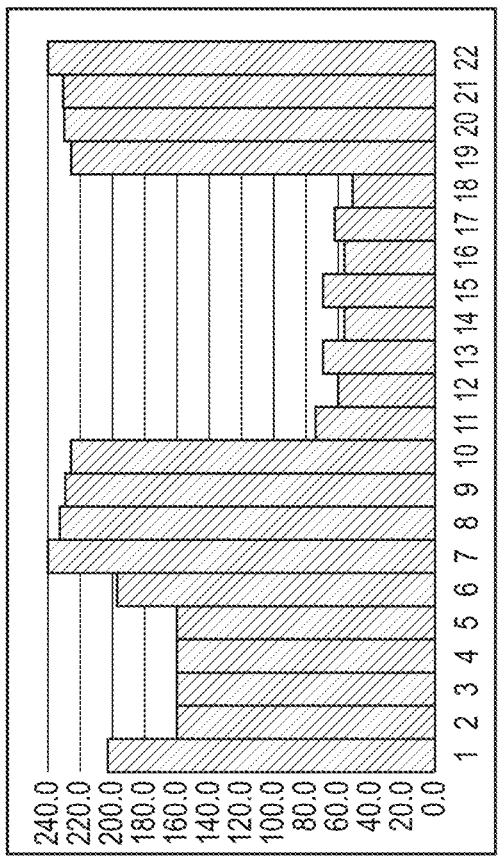
Figure 15A:
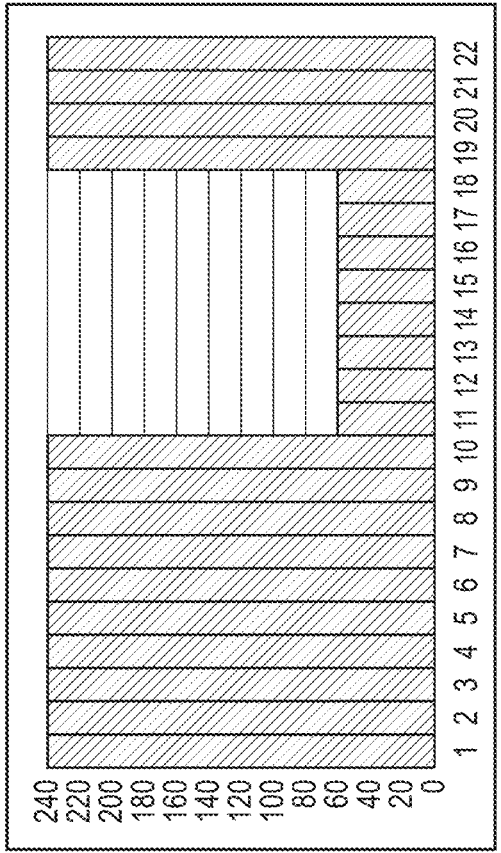

FIG. 15A shows the section of the R component of a given y-axis in a reference image. An object having a pixel value of 64 exists in pixel position 11 to 18. Pixels having a pixel value of 240 indicate a white portion.

FIG. 15B shows the section of the R component of a given y-axis in a scanned image. Pixels having a pixel value of 240 indicate a blank paper portion of a storage medium. Pixel positions 3 and 4 have anomaly, so the pixel values are lower than peripheral pixel values. Pixel positions 10 to 19 indicate a portion obtained by reading an image obtained by printing the object in the pixel positions 11 to 18 shown in FIG. 15A.

Figure 15C:
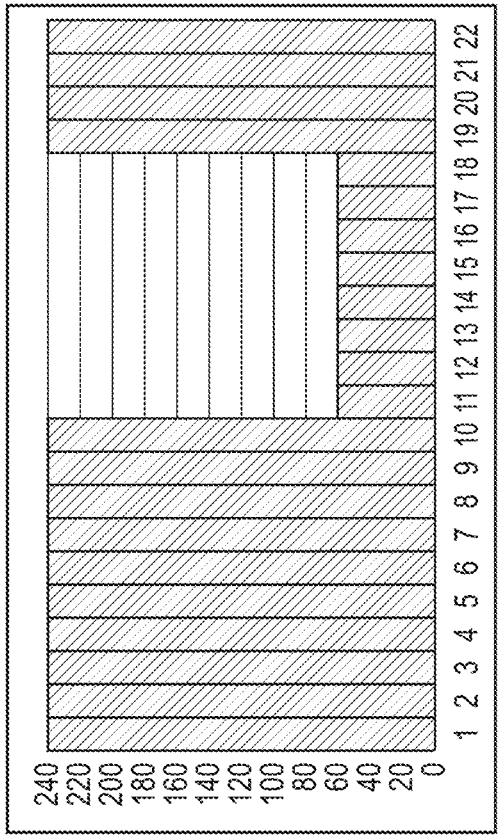

FIG. 15C depicts a view showing the section of a given y-axis in a guide image. FIG. 15D shows a corrected scanned image obtained by applying weighting filter processing to the scanned image, and output from the weighting filter processing module 703. FIG. 15D shows the result of the process of adjusting the image quality difference of the scanned image in the above-described first embodiment, and is the same as FIG. 10D described earlier.

Figure 15E:
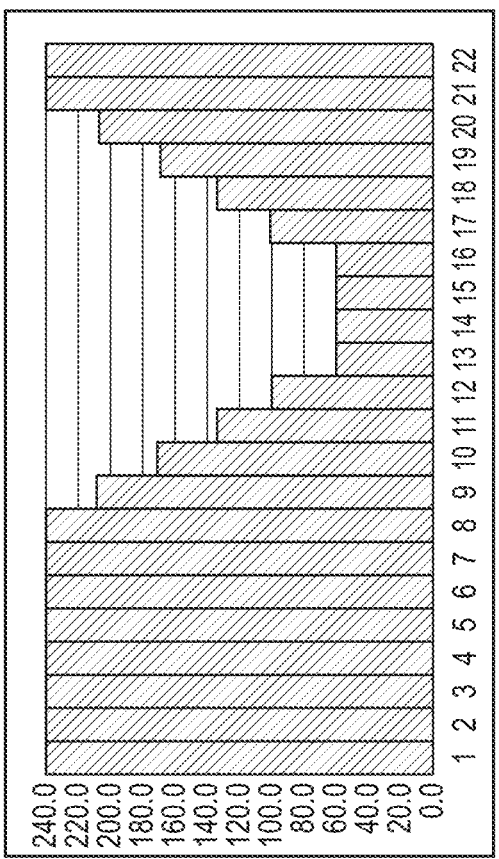
Figure 15F:
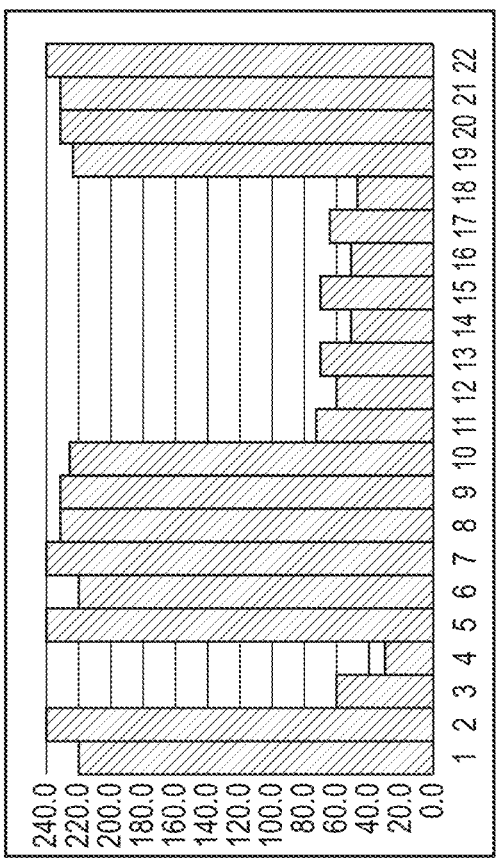
Figure 15G:
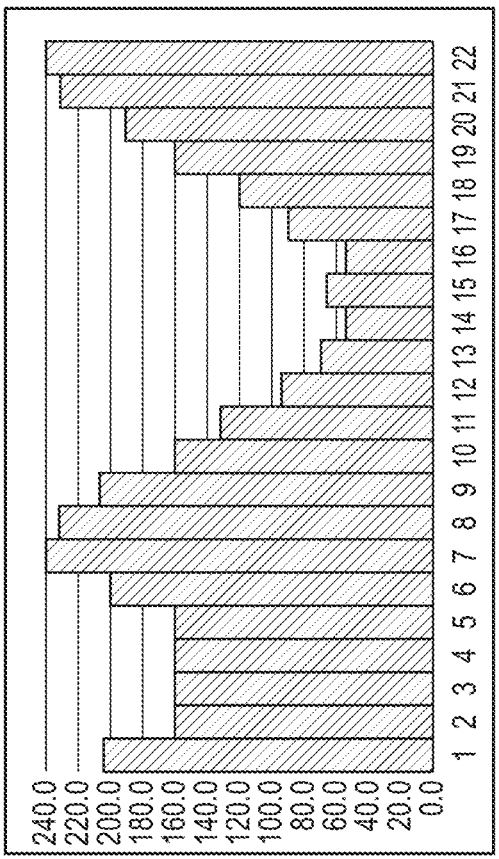
Figure 15H:
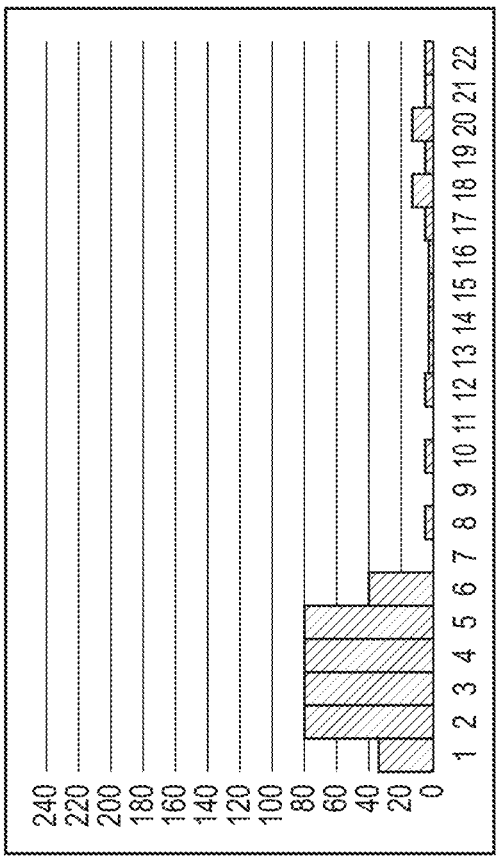

FIG. 15E shows the average luminance values of the scanned image, as an output from the average luminance calculation module 1304. FIG. 15F shows the average luminance values of the reference image, as an output from the average luminance calculation module 1305. FIG. 15G shows absolute values of the differences between the average luminance values of the scanned image and those of the reference image, as an output from the difference calculation module 1306. FIG. 15H shows the result of the process of adjusting the image quality difference of the scanned image in the second embodiment, that is, shows an output from the weighting combining module 1307.

In step S1401 of FIG. 14, the CPU 515 functions as the guide image creation module 701, and creates a guide image from a reference image. In the second embodiment, the calculation is performed by a weighted average using the NTSC coefficient. Note that the creation of the guide image is not limited to this, and another grayscale conversion method can also be used. Note also that the guide image is desirably converted into an image in which the distances between the color of a pixel of interest and respective colors of reference pixels are known.

In step S1402, the CPU 515 functions as the weighting filter calculation module 702, and calculates the weighting factors of the weighting filter from the guide image. This calculation method is the same as step S802 of the first embodiment described above. In step S1403, the CPU 515 functions as the weighting filter processing module 703, and performs weighting filter processing on the scanned image. This processing is the same as step S803 in FIG. 8 of the first embodiment. In step S1404, the CPU 515 functions as the average luminance calculation module 1304 and the average luminance calculation module 1305, and calculates the average luminance values of the scanned image and the reference image. In the second embodiment, the CPU 515 calculates the average luminance value of a pixel of interest, two peripheral pixels to the left of the pixel of interest, and two peripheral pixels to the right of the pixel of interest, that is, a total of five pixels.

FIG. 15E shows the result of calculation of the average luminance values of the scanned image shown in FIG. 15B. FIG. 15F shows the result of the calculation of the average luminance values of the reference image shown in FIG. 15A.

In step S1405, the CPU 515 functions as the difference calculation module 1306, and calculates the difference of the average luminance values between the scanned image and the reference image. More specifically, the CPU 515 calculates an absolute value of the difference between the average luminance values of pixels of interest in the scanned image and the reference image. This makes it possible to specify a pixel position where it is highly likely that an abnormal pixel exists.

FIG. 15G shows the absolute values of the difference between the average luminance values shown in FIGS. 15E and 15F.

In step S1406, the CPU 515 functions as the weighting combining module 1307, and performs the weighting combining process on the scanned image. More specifically, the CPU 515 creates a corrected scanned image by using equation (4) below:

$$\text{OutData} = \text{TarData} \times \alpha + \text{FilData} \times (1-\alpha) \quad (4)$$

where OutData is a pixel value as an output from the weighting combining module 1307, TarData is the pixel value of the scanned image, FilData is the pixel value of an output of the weighting filter processing, and α is weighting calculated from the difference between the average luminance values. The weighting α is calculated by normalizing an absolute value of the difference between the average luminance values. More specifically, the weighting α is calculated by equation (5) below:

$$\alpha = \text{Diff}/T \quad (5)$$

where Diff is the pixel value of an absolute value of the difference between the average luminance values, and T is a constant (77 in the second embodiment) for normalization.

A case in which the position of a pixel of interest is the pixel position 3 shown in FIGS. 15A to 15D will be explained below.

In FIG. 15E, the average luminance value in the pixel position 3 of the scanned image is 163. In FIG. 15F, the average luminance value in the pixel position 3 of the reference image is 240. Accordingly, the difference Diff between absolute values is 77. When the weighting α is calculated by dividing the difference Diff(77) by a constant M(77), α is 1.

In FIG. 15B, the pixel value in the pixel position 3 of the scanned image TarData is 64. In FIG. 15D, the pixel value in the pixel position 3 of the weighting filter image FilData is 163.

The weighting combining process of the pixel position 3 is performed by using equation (4) described above:

$$\begin{aligned}\text{OutData} &= \text{TarData} \times \alpha + \text{FilData} \times (1-\alpha) \\ &= 64 \times 1 + 163 \times (1-1) \\ &= 64\end{aligned}$$

This reveals that a result as shown in FIG. 15H is obtained when the weighting combining process is performed in accordance with the difference between the average luminance values of the scanned image and the reference image.

When the weighting filter processing is performed on the scanned image as shown in FIG. 15D showing the result of the image quality difference adjustment process in the first embodiment, the filter processing is applied to abnormal pixels in the pixel positions 3 and 4 as well. Consequently, abnormal information in the pixel positions 3 and 4 of FIG. 15B deteriorates in FIG. 15D. By contrast, FIG. 15H showing the result of the image quality difference adjustment process according to the second embodiment shows that the anomalies in the pixel positions 3 and 4 are preserved.

Note that the method of the weighting combining process is not limited to this, and need only be a method capable of combining a scanned image and a weighting filter image in accordance with the weight. For example, the weight is linear in the second embodiment, but the weight may also have a nonlinear shape.

In step S1407, the controller 503 determines whether the above processing has been performed on all pixels. If it is determined that the processing on all pixels is not complete, the process advances to step S1408. If the processing on all pixels is complete, the controller 503 terminates the process. In step S1408, the controller 503 shifts the pixel of interest to the next pixel, and performs the processing from step S1402 to step S1407 again.

In the second embodiment as explained above, the process of adjusting the image quality difference is performed on a scanned image based on information of the difference between the average luminance values of the scanned image and a reference image. This makes it possible to prevent missing of defect information while approximating the scanned image to the reference image. Accordingly, it is possible to decrease the difference between the scanned image and the reference image, which is produced by, for example, the influence of image processing before printing, the influence of the characteristics of a printing apparatus, and the influence of the characteristics of a scanner. This can reduce the ratio at which an image is found to be a defective image by mistake although there is no image anomaly.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-140267, filed Aug. 30, 2021, which is hereby incorporated by reference herein in its entirety.

What is claimed is:

1. An inspection apparatus comprising:
one or more controllers including one or more processors and one or more memories, the one or more controllers being configured to:
obtain a scanned image by reading a printed product;
calculate a weighting factor of a weighting filter based on differences between a value of a pixel of interest in a reference image used in creation of the printed product and values of peripheral pixels of the pixel of interest;
perform filter processing by using the weighting filter having the weighting factor, with respect to a pixel of interest in the scanned image, which corresponds to the pixel of interest in the reference image, thereby shifting the pixel of interest in the scanned image, and create an inspection target image by calculating the weighting factor and performing the filter processing with respect to the shifted pixel of interest; and
inspect quality of the printed product by collating the inspection target image with the reference image.

2. The inspection apparatus according to claim 1, wherein in reading the printed product, the one or more controllers are configured to detect skew feeding of the scanned image, and deform the scanned image based on the skew feeding.

3. The inspection apparatus according to claim 1, wherein the one or more controllers are further configured to align the scanned image and the reference image before the collating.

4. The inspection apparatus according to claim 1, wherein the one or more controllers are further configured to, if the scanned image and the reference image have different resolutions, convert the resolutions before the filter processing such that the resolutions of the scanned image and the reference image become equal.

5. An inspection apparatus comprising:
one or more controllers including one or more processors and one or more memories, the one or more controllers being configured to:
obtain a scanned image by reading a printed product;
calculate a weighting factor of a weighting filter based on differences between a value of a pixel of interest in a reference image used in creation of the printed product and values of peripheral pixels of the pixel of interest;
calculate a difference between an average luminance value of the reference image and an average luminance value of the scanned image;
create an inspection target image by combining the scanned image and an image obtained by performing filter processing on the scanned image by using the weighting filter, in accordance with a weighting amount based on the difference between the average luminance values; and
inspect quality of the printed product by collating the inspection target image with the reference image.

6. The inspection apparatus according to claim 5, wherein the filter processing is performed in accordance with:

$$g(x, y) = \frac{\sum_n \sum_m W_s(n, m) W_I(x, y, n, m) h(x, y)}{\sum_n \sum_m W_s(n, m) W_I(x, y, n, m)},$$

where g is a pixel value of a target after the filter processing, h is the pixel value of the target before the filter processing, x and y indicate a pixel position, n and m are pixel positions within a filter range, $W_s$ is a function for determining a weight based on a spatial distance, and $W_I$ is a function for determining a weight based on a pixel value difference of a guide image.

7. The inspection apparatus according to claim 5, wherein the weighting amount is a value obtained by normalizing an absolute value of the difference between the average luminance values.

8. The inspection apparatus according to claim 5, wherein in the creation of the inspection target image, the one or more controllers are configured to, if the difference between the average luminance values is greater than a predetermined value, create the inspection target image by increasing the weighting of the scanned image.

9. The inspection apparatus according to claim 5, wherein in reading the printed product, the one or more controllers are configured to detect skew feeding of the scanned image, and deform the scanned image based on the skew feeding.

10. The inspection apparatus according to claim 5, wherein the one or more controllers are further configured to align the scanned image and the reference image before the collating.

11. The inspection apparatus according to claim 5, wherein the one or more controllers are further configured to, if the scanned image and the reference image have different resolutions, convert the resolutions before the filter processing such that the resolutions of the scanned image and the reference image become equal.

12. An inspection system comprising:
a printing apparatus; and
an inspection apparatus comprising one or more controllers including one or more processors and one or more memories, the one or more controllers being configured to:
obtain a scanned image by reading a printed product;
calculate a weighting factor of a weighting filter based on a difference between a value of a pixel of interest in a reference image used in creation of the printed product and values of peripheral pixels of the pixel of interest;
perform filter processing by using the weighting filter having the weighting factor, with respect to a pixel of interest in the scanned image, which corresponds to the pixel of interest in the reference image, thereby shifting the pixel of interest in the scanned image, and create an inspection target image by calculating the weighting factor and performing the filter processing with respect to the shifted pixel of interest; and
inspect quality of the printed product by collating the inspection target image with the reference image.

13. The inspection system according to claim 12, wherein in reading the printed product, the one or more controllers are configured to detect skew feeding of the scanned image, and deform the scanned image based on the skew feeding.

14. The inspection system according to claim 12, wherein the one or more controllers are further configured to align the scanned image and the reference image before the collating.

15. The inspection system according to claim 12, wherein the one or more controllers are further configured to, if the scanned image and the reference image have different resolutions, convert the resolutions before the filter processing such that the resolutions of the scanned image and the reference image become equal.

16. A method of controlling an inspection apparatus, the method comprising:

obtaining a scanned image by reading a printed product;

calculating a weighting factor of a weighting filter based on a difference between a value of a pixel of interest in a reference image used in creation of the printed product and values of a peripheral pixels of the pixel of interest;

performing filter processing by using the weighting filter having the weighting factor, with respect a pixel of interest in the scanned image, which corresponds to the pixel of interest in the reference image, thereby shifting the pixel of interest in the scanned image, and creating an inspection target image by calculating the weighting factor and performing the filter processing with respect to the shifted pixel of interest; and inspecting quality of the printed product by collating the inspection target image with the reference image.

17. A non-transitory computer-readable storage medium storing a program for causing a processor to execute a method of controlling an inspection apparatus, the method comprising:

obtaining a scanned image by reading a printed product;

calculating a weighting factor of a weighting filter based on a difference between a value of a pixel of interest in a reference image used in creation of the printed product and values of a peripheral pixels of the pixel of interest;

performing filter processing by using the weighting filter having the weighting factor, with respect a pixel of interest in the scanned image, which corresponds to the pixel of interest in the reference image, thereby shifting the pixel of interest in the scanned image, and creating an inspection target image by calculating the weighting factor and performing the filter processing with respect to the shifted pixel of interest; and inspecting quality of the printed product by collating the inspection target image with the reference image.

* * * * *